United States Patent
Tsuboi et al.

(10) Patent No.: US 11,102,669 B2
(45) Date of Patent: Aug. 24, 2021

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Hidekazu Tsuboi, Sakai (JP); Shohei Yamada, Sakai (JP); Kazunari Yokomakura, Sakai (JP); Hiroki Takahashi, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/495,847

(22) PCT Filed: Mar. 20, 2018

(86) PCT No.: PCT/JP2018/011048
§ 371 (c)(1),
(2) Date: Sep. 20, 2019

(87) PCT Pub. No.: WO2018/174062
PCT Pub. Date: Sep. 27, 2018

(65) Prior Publication Data
US 2020/0077288 A1    Mar. 5, 2020

(30) Foreign Application Priority Data
Mar. 22, 2017    (JP) .............................. JP2017-055589

(51) Int. Cl.
*H04W 24/10*    (2009.01)
*H04W 76/16*    (2018.01)
*H04W 88/06*    (2009.01)

(52) U.S. Cl.
CPC ........... *H04W 24/10* (2013.01); *H04W 76/16* (2018.02); *H04W 88/06* (2013.01)

(58) Field of Classification Search
CPC ...... H04W 24/10; H04W 76/16; H04W 88/06
USPC .......................................................... 370/252
See application file for complete search history.

(56) References Cited

U.S. PATENT DOCUMENTS 10,615,927 B2 * 4/2020 Kim .................. H04W 52/0212
2016/0330680 A1    11/2016 Yi et al.
(Continued)

FOREIGN PATENT DOCUMENTS

WO    2016/038763 A1    3/2016
WO    2016/049431 A1    3/2016
(Continued)

OTHER PUBLICATIONS

Official Communication issued in International Patent Application No. PCT/JP2018/011048, dated Jun. 12, 2018.
(Continued)

*Primary Examiner* — Chi Tang P Cheng
(74) *Attorney, Agent, or Firm* — Keating & Bennett, LLP

(57) ABSTRACT

A terminal apparatus configured to receive a measurement configuration from one or more base station apparatuses transmits a first measurement result and a second measurement result, and the first measurement result includes, as measurement results of a serving cell, the measurement results of the serving cell of a first cell group and the serving cell of a second cell group, and the second measurement result includes, as a measurement result of a serving cell, the measurement result of the serving cell of the second cell group.

2 Claims, 19 Drawing Sheets

(56) References Cited

U.S. PATENT DOCUMENTS

2017/0118658 A1* 4/2017 Hwang ................ H04W 16/32
2017/0265172 A1 9/2017 Futaki
2017/0303151 A1* 10/2017 Lunden ................ H04W 76/28
2017/0311370 A1* 10/2017 Dalsgaard ............ H04W 76/28
2018/0206138 A1 7/2018 Hayashi et al.

FOREIGN PATENT DOCUMENTS

WO WO-2016049431 A1 * 3/2016 ........ H04W 36/0058
WO 20170103679 A1 1/2017

OTHER PUBLICATIONS

NTT DOCOMO, "Revision of SI: Study on New Radio Access Technology", 3GPP TSG RAN Meeting #72, RP-161214, Jun. 13-16, 2016, 8 pages.
Qualcomm Incorporated, "Way forward on capabilities coordination for EN-DC", 3GPP TSG-RAN WG2 Meeting NR ad-hoc, R2-1700574, Jan. 17-19, 2017, pp. 1-3.
LG Electronics Inc., "CP procedure for tight interworking between LTE and NR", 3GPP TSG-RAN2 Meeting #97, R2-1701967, Feb. 13-17, 2017, pp. 1 & 2.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.2.0, Mar. 2017, pp. 1-721.

* cited by examiner

```
RRCConnectionReconfiguration ::=        SEQUENCE {
    rrc-TransactionIdentifier           RRC-TransactionIdentifier,
    measConfig                          MeasConfig,
    mobilityControlInfo                 MobilityControlInfo,
    dedicatedInfoNASList                SEQUENCE (SIZE(1..maxDRB)) OF DedicatedInfoNAS,
    radioResourceConfigDedicated        RadioResourceConfigDedicated,
    securityConfigHO                    SecurityConfigHO,
    otherConfig                         OtherConfig,
    fullConfig                          ENUMERATED {true},
    sCellToReleaseList                  SCellToReleaseList,
    sCellToAddModList                   SCellToAddModList,
    scg-Configuration                   SCG-Configuration,
    systemInfomationBlockDedicated      OCTET STRING (CONTAINING SIBx)
}
```

FIG. 10

```
SCG-Configuration ::= CHOICE {
    release     NULL,
    setup       SEQUENCE {
                scg-ConfigPartMCG    SCG-ConfigPartMCG,
                scg-ConfigPartSCG    SCG-ConfigPartSCG
    }
}
```

FIG. 11

```
SCG-ConfigPartSCG ::=   SEQUENCE {
    radioResourceConfigDedicatedSCG    RadioResourceConfigDedicatedSCG,
    pSCellToAddMod                     PSCellToAddMod,
    sCellToAddModListSCG               SCellToAddModList,
    sCellToReleaseListSCG              SCellToReleaseList,
    mobilityControlInfoSCG             MobilityControlInfoSCG
}
```

FIG. 12

```
MeasResults ::= SEQUENCE {
    measId              MeasId,
    measResultPCell     SEQUENCE {
        rsrpResult          RSRP-Range,
        rsrqResult          RSRQ-Range
    },
    measResultNeighCells    CHOICE {
        measResultListEUTRA     MeasResultListEUTRA,
        measResultListNR        MeasResultListNR,
        measResultListUTRA      MeasResultListUTRA,
        measResultListGERAN     MeasResultListGERAN,
        measResultsCDMA2000     MeasResultsCDMA2000,
    },
    measResultServFreqList-r10  MeasResultServFreqList-r10
}
```

FIG. 17

```
MeasResultServFreqList ::= SEQUENCE (SIZE (1..maxServCell)) OF MeasResultServFreq MeasResultServFreq ::=    SEQUENCE {
    servFreqId-r10            ServCellIndex-r10,
    measResultSCell-r10       SEQUENCE {
        rsrpResultSCell-r10       RSRP-Range,
        rsrqResultSCell-r10       RSRQ-Range
    },
    measResultBestNeighCell-r10  SEQUENCE {
        physCellId-r10            PhysCellId,
        rsrpResultNCell-r10       RSRP-Range,
        rsrqResultNCell-r10       RSRQ-Range
    }
}
```

FIG. 18

```
MeasResultListNR    ::=    SEQUENCE (SIZE (1..maxCellReport)) OF MeasResultNR
MeasResultListEUTRA ::=    SEQUENCE (SIZE (1..maxCellReport)) OF MeasResultEUTRA MeasResultEUTRA ::= SEQUENCE {
    physCellId      PhysCellId,
    cgi-Info        SEQUENCE {
        cellGlobalId        CellGlobalIdEUTRA,
        trackingAreaCode    TrackingAreaCode,
        plmn-IdentityList   PLMN-IdentityList
    },
    measResult      SEQUENCE {
        rsrpResult      RSRP-Range,
        rsrqResult      RSRQ-Range,
    }
}
```

FIG. 19

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2017-055589 filed on Mar. 22, 2017, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP).

Furthermore, as a radio access method and a radio access network technology for a fifth-generation cellular system, the 3GPP is conducting a technical study of LTE-Advanced Pro, which is an enhanced technology of LTE, and New Radio Technology (NR), which is a new radio access technology, and formulating standards for the technologies (NPL 1).

CITATION LIST

Non Patent Literature

NPL 1: RP-161214, NTT DOCOMO, "Revision of SI: Study on New Radio Access Technology", June 2016
NPL 2: 3GPP R2-1700574
http://www.3gpp.org/ftp/tsg_ran/WG2_RL2/TSGR2_AHs/2017_01_NR/Docs/R2-1700574.zip
NPL 3: 3GPP R2-1701967
http://www.3gpp.org/ftp/tsg_ran/WG2_RL2/TSGR2_97/Docs/R2-1701967.zip

SUMMARY OF INVENTION

Technical Problem

A mechanism has been studied where cells of Radio Access Technology (RAT) for both LTE and NR are grouped into a cell group for each RAT to be assigned to a terminal apparatus, and the terminal apparatus and one or more base station apparatuses communicate with each other (E-UTRA-NR Dual Connectivity: EN-DC) (NPL 2).

In EN-DC, a mechanism has been studied where the base station apparatus and the terminal apparatus directly configure and report some radio resource control (RRC) measurements for each cell group, and select appropriate cells to be used for communication (NPL 3).

However, in Dual Connectivity (DC) using a conventional LTE cell, the measurement configuration and report are performed only in one cell group, so there has been a problem in that in a case that this is applied to multiple cell groups, communication between the base station apparatus and the terminal apparatus cannot be efficiently performed.

An aspect of the present invention has been made in view of the circumstances described above, and has an object to provide a terminal apparatus capable of efficiently communicating with a base station apparatus, a base station apparatus communicating with the terminal apparatus, a communication method used for the terminal apparatus, a communication method used for the base station apparatus, an integrated circuit mounted on the terminal apparatus, and an integrated circuit mounted on the base station apparatus.

Solution to Problem (1) In order to accomplish the object described above, an aspect of the present invention is contrived to provide the following means. In other words, an aspect of the present invention is a terminal apparatus for receiving a measurement configuration from one or more base station apparatuses, the measurement configuration including a measurement object, a reporting configuration, and a measurement identifier, the measurement object including at least an identifier for individually identifying the measurement object (measurement object identifier) and information of a frequency to be measured, the reporting configuration including at least an identifier for individually identifying the reporting configuration (reporting configuration identifier) and information of a condition to be reported, and the measurement identifier being an identifier for individually identifying information for indicating a combination of the measurement object identifier and the reporting configuration identifier, the terminal apparatus including a receiver configured to receive the reporting configuration, and a transmitter configured to transmit a first measurement result and a second measurement result, wherein the first measurement result includes, as measurement results of a serving cell, the measurement results of the serving cell of a first cell group and the serving cell of a second cell group, and the second measurement result includes, as a measurement result of a serving cell, the measurement result of the serving cell of the second cell group.

(2) An aspect of the present invention is a communication method applied to a terminal apparatus for receiving a measurement configuration from one or more base station apparatuses, the measurement configuration including a measurement object, a reporting configuration, and a measurement identifier, the measurement object including at least an identifier for individually identifying the measurement object (measurement object identifier) and information of a frequency to be measured, the reporting configuration including at least an identifier for individually identifying the reporting configuration (reporting configuration identifier) and information of a condition to be reported, and the measurement identifier being an identifier for individually identifying information for indicating a combination of the measurement object identifier and the reporting configuration identifier, the communication method including the steps of receiving the reporting configuration, and transmitting a first measurement result and a second measurement result, wherein the first measurement result includes, as measurement results of a serving cell, the measurement results of the serving cell of a first cell group and the serving cell of a second cell group, and the second measurement result includes, as a measurement result of a serving cell, the measurement result of the serving cell of the second cell group.

(3) An aspect of the present invention is an integrated circuit to be mounted on a terminal apparatus for receiving a measurement configuration from one or more base station apparatuses, the measurement configuration including a measurement object, a reporting configuration, and a measurement identifier, the measurement object including at least an identifier for individually identifying the measurement object (measurement object identifier) and information of a frequency to be measured, the reporting configuration including at least an identifier for individually identifying the reporting configuration (reporting configuration identifier) and information of a condition to be reported, and the measurement identifier being an identifier for individually identifying information for indicating a combination of the measurement object identifier and the reporting configuration identifier, the integrated circuit causing the terminal apparatus to exert receiving the reporting configuration, and transmitting a first measurement result and a second measurement result, wherein the first measurement result includes, as measurement results of a serving cell, the measurement results of the serving cell of a first cell group and the serving cell of a second cell group, and the second measurement result includes, as a measurement result of a serving cell, the measurement result of the serving cell of the second cell group.

Advantageous Effects of Invention

According to an aspect of the present invention, the terminal apparatus and the base station apparatus can communicate efficiently.

BRIEF DESCRIPTION OF DRAWINGS

FIG. 10 is a diagram illustrating an example of an RRC connection reconfiguration message according to the embodiment of the present invention.

FIG. 11 is a diagram illustrating an example of elements included in the RRC connection reconfiguration message according to the embodiment of the present invention.

FIG. 12 is a diagram illustrating an example of elements included in the RRC connection reconfiguration message according to an embodiment of the present invention.

FIG. 17 is a diagram illustrating an example of a measurement result according to the embodiment of the present invention.

FIG. 18 is a diagram illustrating an example of a measurement result of a serving cell according to the embodiment of the present invention.

FIG. 19 is a diagram illustrating an example of a measurement result of a neighbor cell according to the embodiment of the present invention.

DESCRIPTION OF EMBODIMENTS

Embodiments of the present invention will be described below.

A radio communication system and a radio network according to the present embodiment will be described.

LTE (and LTE-A Pro) and NR may be defined as different RATs. NR may be defined as a technology included in LTE. LTE may be defined as a technology included in NR. LTE connectable with NR by Dual connectivity may be distinguished from conventional LTE. The present embodiment may be applied to NR, LTE and other RATs. Terms associated with LTE and NR are used in the following description. However, the present invention may be applied to other technologies using other terms.

Figure 1:
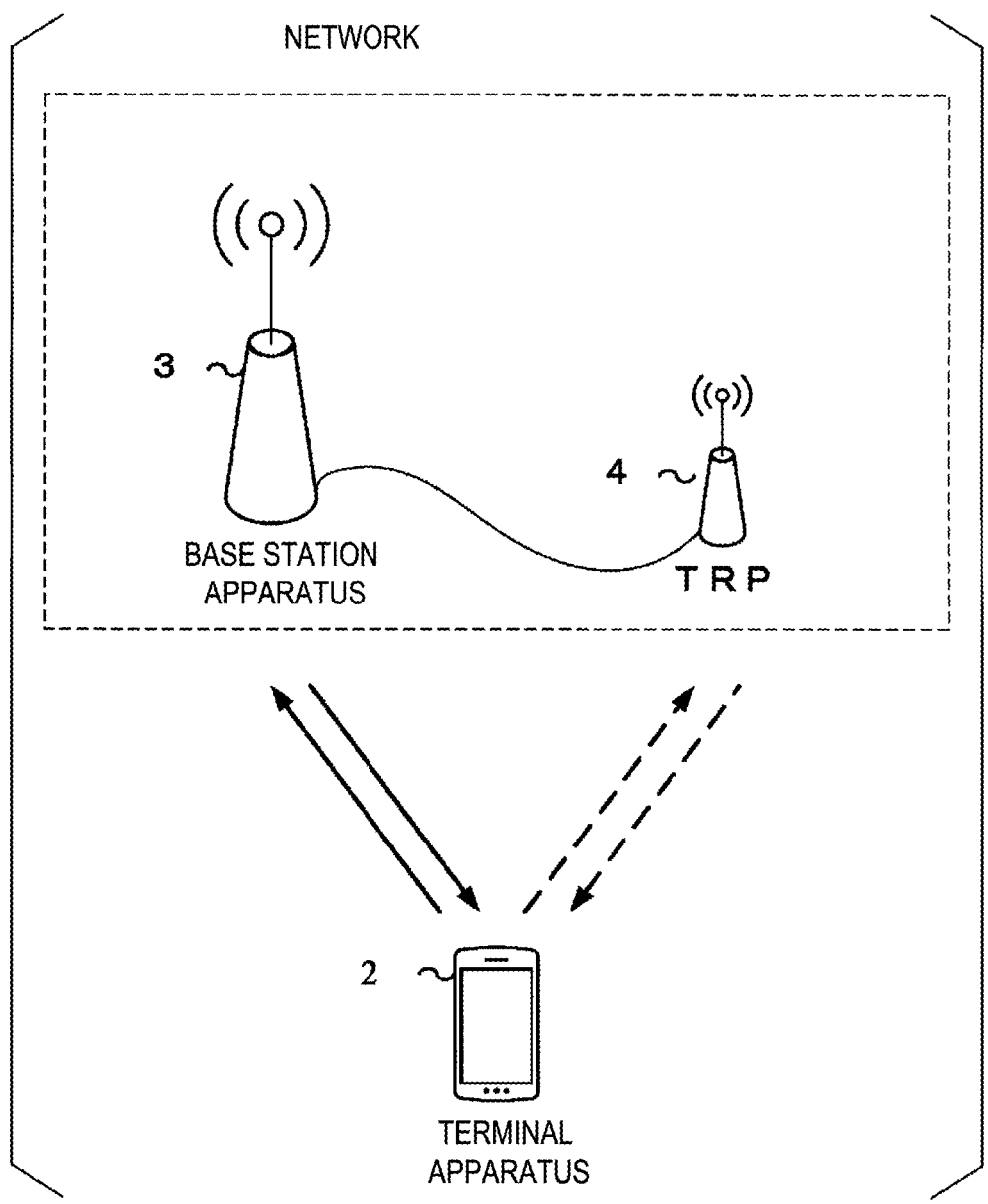
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 2 and a base station apparatus 3. The base station apparatus 3 may include one or more transmission reception points (TRPs) 4. The base station apparatus 3 may have a communicable range (communication area), controlled by the base station apparatus 3, that includes one or more cells to serve the terminal apparatus 2. The base station apparatus 3 may include a core network apparatus. The base station apparatus 3 may have a communicable range (communication area), controlled by one or more transmission reception points 4, that includes one or more cells to serve the terminal apparatus 2. One cell may be divided into multiple Beamed areas (also referred to as Beamed cells) to serve the terminal apparatus 2 in each of the beamed areas. Here, the beamed area may be identified based on a beam index used for beamforming, a quasi-collocation index or a precoding index.

The communication area covered by the base station apparatus 3 may be different in a size and a shape for each frequency. The covered area may be different for each frequency. A radio network, in which cells having different types of base station apparatuses 3 and different cell radii coexist at the same frequency or different frequencies to form a single communication system, is referred to as a heterogeneous network.

A radio communication link from the base station apparatus 3 to the terminal apparatus 2 is referred to as a downlink. A radio communication link from the terminal apparatus 2 to the base station apparatus 3 is referred to as an uplink. A direct radio communication link from the terminal apparatus 2 to another terminal apparatus 2 is referred to as a sidelink.

In FIG. 1, in a radio communication between the terminal apparatus 2 and the base station apparatus 3, and/or a radio communication between the terminal apparatus 2 and another terminal apparatus 2, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

In FIG. 1, in the radio communication between the terminal apparatus 2 and the base station apparatus 3, and/or the radio communication between the terminal apparatus 2 and another terminal apparatus 2, Universal-Filtered Multi-Carrier (UFMC), Filtered OFDM (F-OFDM), OFDM in which a window is multiplied (Windowed OFDM), or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention. For example, the OFDM symbol in the present embodiment may be SC-FDM symbols (also referred to as Single-Carrier Frequency Division Multiple Access (SC-FDMA) symbols).

In FIG. 1, in the radio communication between the terminal apparatus 2 and the base station apparatus 3, and/or the radio communication between the terminal apparatus 2 and another terminal apparatus 2, the above-described transmission scheme that uses no CP or uses zero padding instead of the CP may be employed. The CP and the zero padding may be added both forward and backward.

The terminal apparatus 2 operates while considering the inside of a cell as a communication area. The terminal apparatus 2 may move to another appropriate cell through a cell re-selection procedure in a case that the terminal apparatus 2 is not wirelessly connected (also referred to as an idle state or an RRC_IDLE state). The terminal apparatus 2 may move to another cell through a handover procedure in a case that the terminal apparatus 2 is wirelessly connected (also referred to as a connected state, or an RRC_CONNECTED state). The appropriate cell generally refers to a cell that may be found not to prohibit access from the terminal apparatus 2, based on information indicated by the base station apparatus 3 and that has a downlink reception quality satisfying a predefined condition. The terminal apparatus 2 may move to another appropriate cell through a cell re-selection procedure in a case that the terminal apparatus 2 is in an non-active state (also referred to as an inactive state). The terminal apparatus 2 may move to another cell through a handover procedure in the inactive state.

In a case that the terminal apparatus 2 can communicate with a certain base station apparatus 3, any of the cells of the base station apparatus 3 which is configured to be used for the communication with the terminal apparatus 2 may be referred to as a Serving cell while the other cells which are not used for the communication may be referred to as Neighboring cells. Some or all pieces of the system information required in the serving cell may be broadcast or notified to the terminal apparatus 2 through another cell.

In the present embodiment, one or more serving cells are configured for the terminal apparatus 2. In a case that multiple serving cells are configured for the terminal apparatus 2, multiple configured serving cells may include one primary cell and one or more secondary cells. The primary cell may be a serving cell in which an initial connection establishment procedure has been performed, a serving cell in which a connection re-establishment procedure has been initiated, or a cell indicated as the primary cell by a handover procedure. One or more secondary cells may be configured at a point of time at which a Radio Resource Control (RRC) connection is established or after the RRC connection is established. A cell group (also referred to as a master cell group (MCG)) including one or more serving cells including a primary cell (PCell), and one or more cell groups (also referred to as secondary cell groups (SCGs)) including one or more serving cells not including a primary cell and including a primary secondary cell (PSCell) in which at least a random access procedure can be performed and which does not become a deactivated state may be configured for the terminal apparatus 2. The master cell group includes one primary cell and zero or more secondary cells. The secondary cell group includes one primary secondary cell and zero or more secondary cells. Any of the MCG and the SCG may be a cell group including LTE cells.

Time Division Duplex (TDD) and/or Frequency Division Duplex (FDD) may be applied to the radio communication system according to the present embodiment. A Time Division Duplex (TDD) scheme or a Frequency Division Duplex (FDD) scheme may be applied to all of multiple cells. Cells to which the TDD scheme is applied and cells to which the FDD scheme is applied may be aggregated.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described. However, the downlink physical channels and/or the downlink physical signals may be collectively referred to as downlink signals. The uplink physical channels and/or the uplink physical signals may be collectively referred to as uplink signals. The downlink physical channels and/or the uplink physical channels may be collectively referred to as physical channels. The downlink physical signals and/or the uplink physical signals may be collectively referred to as physical signals.

In FIG. 1, the following downlink physical channels are used for downlink radio communication between the terminal apparatus 2 and the base station apparatus 3. The downlink physical channels are used for transmitting information output from a higher layer.

New Radio Physical Broadcast CHannel (NR-PBCH)
New Radio Physical Downlink Control CHannel (NR-PDCCH)
New Radio Physical Downlink Shared CHannel (NR-PDSCH)

The NR-PBCH is used by the base station apparatus 3 to broadcast important information block (Master Information Block (MIB) and Essential Information Block (EIB)) including important system information (Essential Information) needed by the terminal apparatus 2. Here, one or more important information blocks may be transmitted as important information messages. For example, the important information block may include information indicating a part or all of a frame number (System Frame Number (SFN) (e.g., information about a location in a superframe including multiple frames). For example, the radio frame (10 ms) includes 10 subframes of 1 ms and the radio frame is identified by the frame number. The frame number returns to 0 at 1024 (Wrap around). In a case that important information blocks different for each area within the cell are transmitted, information capable of identifying an area (for example, identifier information of a base station transmission beam constituting the area) may be included. Here, the identifier information of the base station transmission beam may be indicated by using an index of the base station transmission beam (precoding). In a case that important information blocks (important information messages) different for each area within the cell are transmitted, information capable of identifying a time location within the frame (for example, a subframe number in which the important information block (important information message) is included) may be included. That is, information for determining each of the subframe numbers in which the respective important information blocks (important information messages) using the indexes of the different base station transmission beams are transmitted may be included. For example, information necessary for connection to the cell and for mobility may be included in the important information. The important information message may be a part of a system information message. Some or all of the important information messages may be referred to as minimum system information (Minimum SI). In a case that none of the valid minimum system information in a given cell is acquired, the terminal apparatus 2 may consider the cell as a cell (Barred Cell) to which access is prohibited. Only a part of the minimum system information may be broadcast on the PBCH and the remaining minimum system information may be transmitted on the NR-PSCH, which will be described later.

The NR-PDCCH is used to transmit Downlink Control Information (DCI) in a downlink radio communication (radio communication from the base station apparatus 3 to the terminal apparatus 2). Here, one or more pieces of DCI (which may be referred to as DCI formats) are defined for transmission of the downlink control information. That is, a field for the downlink control information is defined as the DCI, and is mapped to information bits.

For example, the DCI may be defined to include information indicating a timing for transmitting a HARQ-ACK for a scheduled NR-PDSCH (for example, the number of symbols from the last symbol included in the NR-PDSCH to the HARQ-ACK transmission).

For example, the DCI may be defined to be used for scheduling one downlink radio communication NR-PDSCH in one cell (transmission of one downlink transport block).

For example, the DCI may be defined to be used for scheduling one uplink radio communication NR-PUSCH in one cell (transmission of one uplink transport block).

Here, the DCI includes information on scheduling of the NR-PDSCH or NR-PUSCH. Here, the DCI for the downlink is also referred to as downlink grant or downlink assignment. Here, the DCI for the uplink is also referred to as uplink grant or Uplink assignment.

The NR-PDSCH is used to transmit downlink data (Downlink Shared CHannel (DL-SCH)) from medium access (Medium Access Control (MAC)). The NR-PDSCH is also used to transmit System Information (SI), Random Access Response (RAR), and the like.

Here, the base station apparatus 3 and the terminal apparatus 2 exchange (transmit and/or receive) signals with each other in a higher layer. For example, the base station apparatus 3 and the terminal apparatus 2 may transmit and/or receive, in a Radio Resource Control (RRC) layer, RRC signaling (also referred to as Radio Resource Control message (RRC message), radio Resource Control information (RRC information)). The base station apparatus 3 and the terminal apparatus 2 may transmit and/or receive, in a Medium Access Control (MAC) layer, a MAC control element. Here, the RRC signaling and/or the MAC control element is also referred to as higher layer signaling. Here, the higher layer means a higher layer viewed from the physical layer, and thus may include one or more of a MAC layer, an RRC layer, an RLC layer, a PDCP layer, a NAS layer, and the like. For example, in processing of the MAC layer, the higher layer may include one or more of an RRC layer, an RLC layer, a PDCP layer, a NAS layer, and the like.

The NR-PDSCH may be used to transmit the RRC signaling and the MAC control element. Here, the RRC signaling transmitted from the base station apparatus 3 may be signaling common to multiple terminal apparatuses 2 in a cell. The RRC signaling transmitted from the base station apparatus 3 may be signaling dedicated to a certain terminal apparatus 2 (also referred to as dedicated signaling). In other words, information specific to the terminal apparatus (UE specific information) may be transmitted through signaling dedicated to the certain terminal apparatus 2.

The NR-PRACH may be used to transmit a random access preamble. The NR-PRACH may be used to indicate an initial connection establishment procedure, a handover procedure, a connection re-establishment procedure, uplink transmission synchronization (timing adjustment), and an NR-PUSCH (UL-SCH) resource request.

In FIG. 1, the following downlink physical signals are used for the downlink radio communication. Here, the downlink physical signals are not used to transmit the information output from the higher layers but is used by the physical layer.

Synchronization signal (SS)
Reference Signal (RS)

The synchronization signal is used for the terminal apparatus 2 to take synchronization in the frequency domain and the time domain in the downlink. The synchronization signal may include a Primary Synchronization Signal (PSS) and a secondary synchronization signal (Second Synchronization Signal (SSS)). The synchronization signal may be used for the terminal apparatus 2 to identify a cell identifier (also referred to as a Cell Identifier (cell ID), or Physical Cell Identifier (PCI)). The synchronization signal may also be used to select/identify/determine a base station transmission beam to be used by the base station apparatus 3 for downlink beamforming, and/or a terminal reception beam to be used by the terminal apparatus 2. In other words, the synchronization signal may be used to allow the terminal apparatus 2 to select/identify/determine the index of the base station transmission beam applied to the downlink signal by the base station apparatus 3. The synchronization signal, the primary synchronization signal, and the secondary synchronization signal used in NR may be referred to as NR-SS, NR-PSS, and NR-SSS, respectively. The synchronization signal may also be used to measure a quality of the cell. For example, a received power (SSRP) and a reception quality (SSRQ) of the synchronization signal may be used for measurement. The synchronization signal may be used to perform channel compensation on some of the downlink physical channels.

The downlink reference signal (hereinafter, also referred to simply as a reference signal in the present embodiment) may be classified into multiple reference signals, based on applications and the like. For example, one or more of the following reference signals may be used for the reference signal.

Demodulation Reference Signal (DMRS)
Channel State Information Reference Signal (CSI-RS)
Phase Tracking Reference Signal (PTRS)
Mobility Reference Signal (MRS)

The DMRS may be used for channel compensation in demodulating a received modulated signal. The DMRS may collectively refer to, or may be individually defined for, DMRS for NR-PDSCH demodulation, DMRS for NR-PDCCH demodulation, and/or DMRS for NR-PBCH demodulation.

The CSI-RS may be used for channel state measurement. The PTRS may be used to track a phase due to movement of the terminal or the like. The MRS may be used to measure the reception quality from multiple base station apparatuses for handover.

A reference signal for compensating a phase noise may be defined for the reference signal.

However, functions of at least some of multiple reference signals described above may be included in other reference signals.

At least one of multiple reference signals described above or other reference signals may be defined as a Cell-specific reference signal (CRS) that is configured individually for the cell, a Beam-specific reference signal (BRS) for each transmit beam used by the base station apparatus 3 or the transmission reception point 4, and/or a UE-specific reference signal (URS) that is configured individually for the terminal apparatus 2.

At least one of the reference signals may be used for the radio parameters, numerologies for a subcarrier spacing, or Fine synchronization sufficient to achieve FFT window synchronization.

At least one of the reference signals may be used for Radio Resource Measurement (RRM). At least one of the reference signals may be used for beam management. The radio resource measurements are also referred to below simply as measurements.

At least one of the reference signals may include a synchronization signal.

In FIG. 1, the following uplink physical channels are used for uplink radio communication between the terminal apparatus 2 and the base station apparatus 3 (or, radio communication from the terminal apparatus 2 to the base station apparatus 3). The uplink physical channels are used to transmit information output from a higher layer.

New Radio Physical Uplink Control CHannel (NR-PUCCH)
New Radio Physical Uplink Shared CHannel (NR-PUSCH)
New Radio Physical Random Access CHannel (NR-PRACH)

The NR-PUCCH is used to transmit Uplink Control Information (UCI). Here, the uplink control information may include Channel State Information (CSI) used to indicate a downlink channel state. The uplink control information may include a Scheduling Request (SR) used to request an UL-SCH resource. The uplink control information may include a Hybrid Automatic Repeat request ACKnowledgment (HARQ-ACK). The HARQ-ACK may indicate a HARQ-ACK for downlink data (Transport block, Medium Access Control Protocol Data Unit (MAC PDU), Downlink-Shared Channel (DL-SCH)).

The NR-PDSCH is used to transmit uplink data (Uplink Shared CHannel (UL-SCH)) from medium access (Medium Access Control (MAC)). The NR-PUSCH may be used to transmit a HARQ-ACK and/or CSI along with the uplink data. The NR-PUSCH may be used to transmit CSI only, or a HARQ-ACK and CSI only. That is, the NR-PUSCH may be used to transmit the UCI only.

The NR-PUSCH may be used to transmit the RRC signaling and the MAC control element. The NR-PUSCH may be used to transmit UE Capability in the uplink.

Note that for the NR-PDCCH and the NR-PUCCH, the same reference appellation (for example, NR-PCCH) and the same channel definition may be used. For the NR-PDSCH and the NR-PUSCH, the same reference appellation (for example, NR-PSCH) and the same channel definition may be used.

The BCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). The transport block is a unit of data that the MAC layer delivers to the physical layer. In the physical layer, the transport block is mapped to a codeword, and coding processing is performed for each codeword.

A radio protocol structure according to the present embodiment will be described.

In the present embodiment, a protocol stack handling user data of the terminal apparatus 2 and the base station apparatus 3 is referred to as User-plane (U-plane (UP)) protocol stack, and a protocol stack handling control data is referred to as Control-plane (C-plane (CP)) protocol stack.

The Physical layer (PHY layer) uses the Physical Channels to provide a transmission service to a higher layer. The PHY layer is connected with a Medium Access Control layer (MAC layer), which is a higher layer, via the transport channels. The data is exchanged via the transport channels between layers, that is, the MAC layer and the PHY layer. The data is transmitted and/or received via the physical channels between the PHY layers of the terminal apparatus 2 and the base station apparatus 3.

The MAC layer maps various logical channels to the various transport channels. The MAC layer is connected with a Radio Link Control layer (RLC layer), which is a higher layer, via the logical channels. The logical channels are roughly classified depending on a type of transmitted information, specifically, classified into the control channels transmitting the control information and the traffic channels transmitting the user information. The MAC layer has a function to control the PHY layer in order to perform Discontinuous Reception and Transmission (DRX and DTX), a function to perform a random access procedure, a function to report transmit power information, a function to perform HARQ control, and the like.

The RLC layer performs Segmentation of the data received from the higher layer to adjust its data size so that a lower layer can appropriately transmit the data. The RLC layer also has a function to ensure Quality of Service (QoS) required for each data. In other words, the RLC layer has a function of data re-transmission control or the like.

A Packet Data Convergence Protocol layer (PDCP layer) may have a header compression function to compress unnecessary control information in order to efficiently transmit an IP packet, which is the user data, in a radio segment. The PDCP layer may also have a data encryption function.

Furthermore, a Radio Resource Control layer (RRC layer) is present in the control-plane protocol stack. The RRC layer performs configuration and reconfiguration of Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message, which is the control information. The DRB may be used as a path for transmitting the user data.

The RBs may be configured between the RRC layers of the base station apparatus 3 and the terminal apparatus 2.

The SRB is defined as a radio bearer used to transmit the RRC message and the NAS message. Further, the SRB to be defined may include an SRB (SRB0) for RRC messages using a CCCH logic channel, an SRB (SRB1) for RRC messages using a DCCH logic channel as well as for NAS messages transmitted prior to the establishment of SRB2, and an SRB (SRB2) for RRC messages including Logged measurement information and the like as well as for NAS messages using a DCCH logical channels. Other SRBs may also be defined.

An MCG SRB is transmitted using the SRB of the MCG. An MCG Split SRB is transmitted using the SRB of the MCG or SCG, but is described herein as the MCG SRB because the PDCP is allocated on the MCG side. In other words, the "MCG SRB" may be replaced with the "MCG SRB and/or MCG Split SRB". The SCG SRB is transmitted using the SRB of the SCG. An SCG Split SRB is transmitted using the SRB of the MCG or SCG, but is described herein as the SCG SRB because the PDCP is allocated on the SCG side. In other words, the "SCG SRB" may be replaced with the "SCG SRB and/or SCG Split SRB".

The MCG SRB may be provided with SRB0, SRB1, and SRB2. The SCG SRB may be provided with no SRB0 and/or SRB1.

The NAS and RRC messages may be sent via the MCG SRB, and the RRC messages may be sent via the SCG SRB. The NAS messages may not be sent via the SCG SRB.

Note that the PHY layer corresponds to a physical layer as the first layer in the layered structure of the generally known Open Systems Interconnection (OSI) model. The MAC layer, the RLC layer, and the PDCP layer correspond to a data link layer as the second layer in the OSI model. The RRC layer corresponds to a network layer as the third layer in the OSI model.

The functional classification of the MAC layer, the RLC layer, and the PDCP layer described above is an example, and some or all of the functions may not be implemented. Some or all of the functions of each layer may be included in another layer. For example, when viewed from the physical layer, the control element in the MAC layer and the RRC signaling are higher layer signaling. For example, when viewed from the MAC layer, the RRC signaling is higher layer signaling. When viewed from the RRC layer, the MAC layer and the physical layer are lower layers. When viewed from the RRC layer, for example, the NAS layer is also referred to as an Upper Layer.

A signaling protocol used between the network and the terminal apparatus 2 is classified into an Access Stratum (AS) protocol and a Non-Access Stratum (NAS) protocol. For example, a protocol in the RRC layer or in a lower layer is the Access Stratum protocol used between the terminal apparatus 2 and the base station apparatus 3. Further, a protocol such as Connection Management (CM) and Mobility Management MM) of the terminal apparatus 2 is the Non-Access Stratum protocol, and is used between the terminal apparatus 2 and a core network (CN). For example, between the terminal apparatus 2 and a Mobility Management Entity (MME), communication using the Non-Access Stratum protocol is transparently performed via the base station apparatus 3.

Hereinafter, the subframe will be described. The subframe in the embodiment may also be referred to as a resource unit, a radio frame, a time period, or a time interval. One or more subframes may constitute one radio frame.

Figure 2:
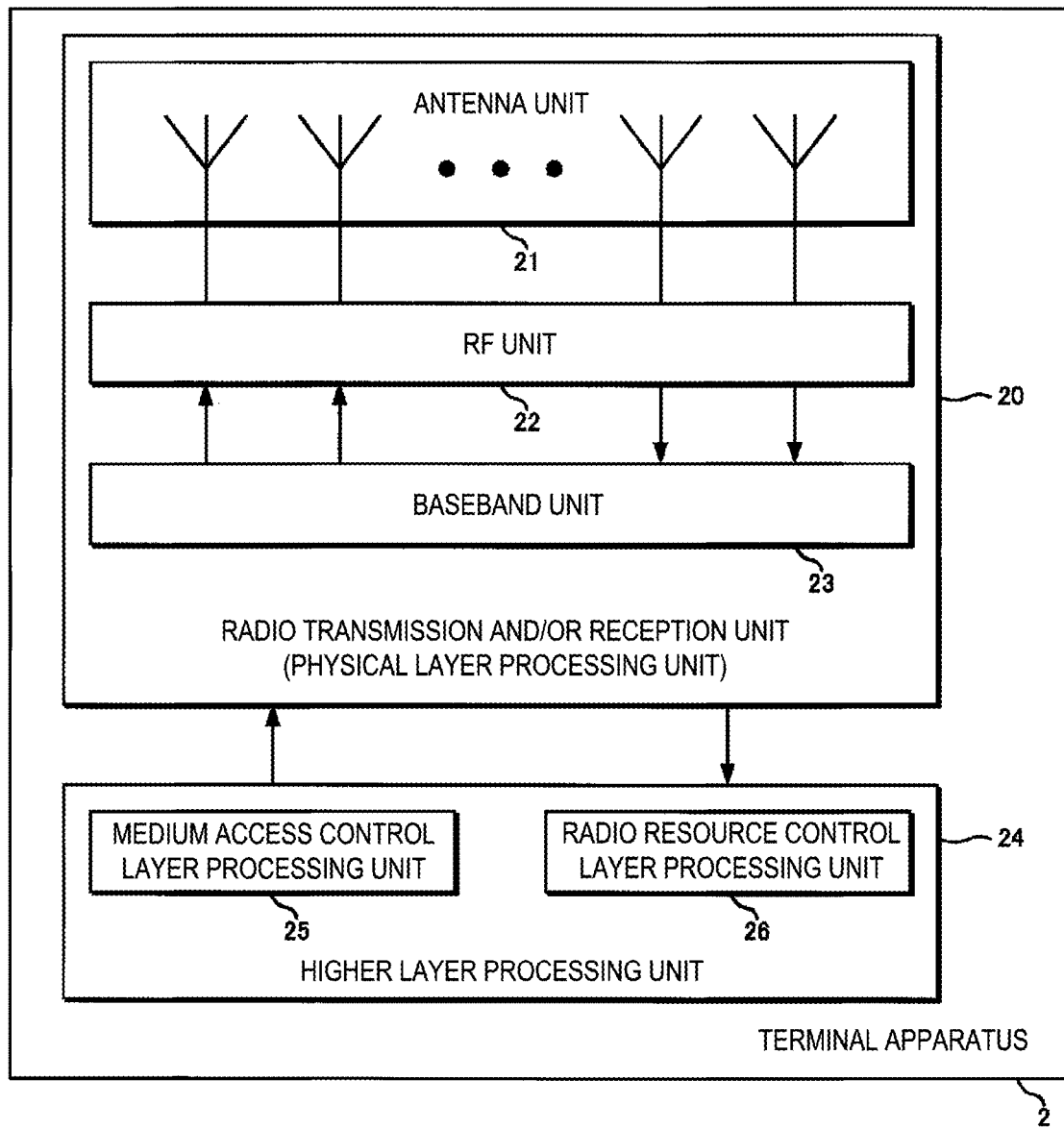
FIG. 2 is a block diagram illustrating an example of a schematic configuration of a terminal apparatus according to an embodiment of the present invention.
Figure 4:
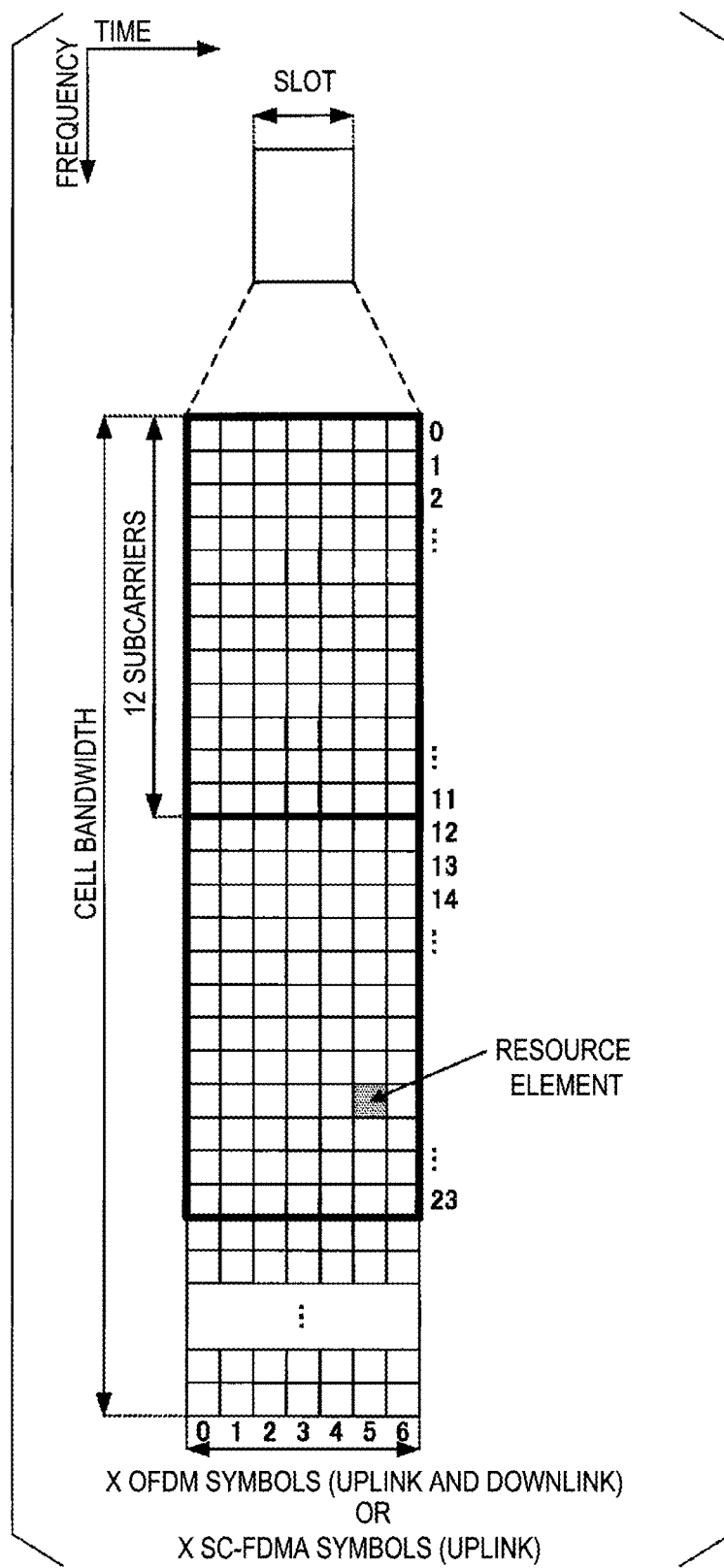
FIG. 4 is a diagram illustrating an example of a schematic configuration of a downlink slot according to the embodiment of the present invention.

FIG. 4 is a diagram illustrating an example of a schematic configuration of a downlink slot according to the embodiment of the present invention. Each of the radio frames is 10 ms in length. Each of the radio frames includes 10 subframes and X slots. That is, a length of one subframe is 1 ms. For each of the slots, a time length is defined depending on a subcarrier spacing. For example, in a case that a subcarrier spacing of OFDM symbols is 15 kHz with a Normal Cyclic Prefix (NCP), X=7 or X=14, where the time length of the slot is 0.5 ms or 1 ms, respectively. In a case the subcarrier spacing is 60 kHz, X=7 or X=14, where the time length of the slot is 0.125 ms or 0.25 ms, respectively. FIG. 2 illustrates a case of X=7 as an example. Note that in a case of X=14, the same expansion can be achieved. The uplink slot may be defined similarly, and the downlink slot and the uplink slot may be defined separately.

The signal or the physical channel transmitted in each of the slots is expressed by a resource grid. The resource grid is defined by multiple subcarriers and multiple OFDM symbols. The number of subcarriers constituting one slot depends on cell downlink and uplink bandwidths. Each element within the resource grid is referred to as a resource element. The resource element may be identified by a subcarrier number and an OFDM symbol number.

A resource block is used to express mapping of resource elements for a certain physical downlink channel (such as the PDSCH) or a certain physical uplink channel (such as the PUSCH). For the resource block, a virtual resource block and a physical resource block are defined. A certain physical uplink channel is first mapped to a virtual resource block. Thereafter, the virtual resource block is mapped to the physical resource block. In a case that the number X of OFDM symbols in a slot is 7 (X=7) with the NCP, one physical resource block is defined by seven OFDM symbols consecutive in the time domain and by 12 subcarriers consecutive in the frequency domain. Specifically, one physical resource block includes (7×12) resource elements. In a case of an Extended CP (ECP), for example, one physical resource block is defined by six OFDM symbols consecutive in the time domain and by 12 subcarriers consecutive in the frequency domain. Specifically, one physical resource block includes (6×12) resource elements. At this time, one physical resource block corresponds to one slot in the time domain and corresponds to 180 kHz in the frequency domain in a case of the 15 kHz subcarrier spacing (or, 720 kHz in a case of the 60 kHz subcarrier spacing). The physical resource blocks are numbered from zero in the frequency domain.

Figure 5:
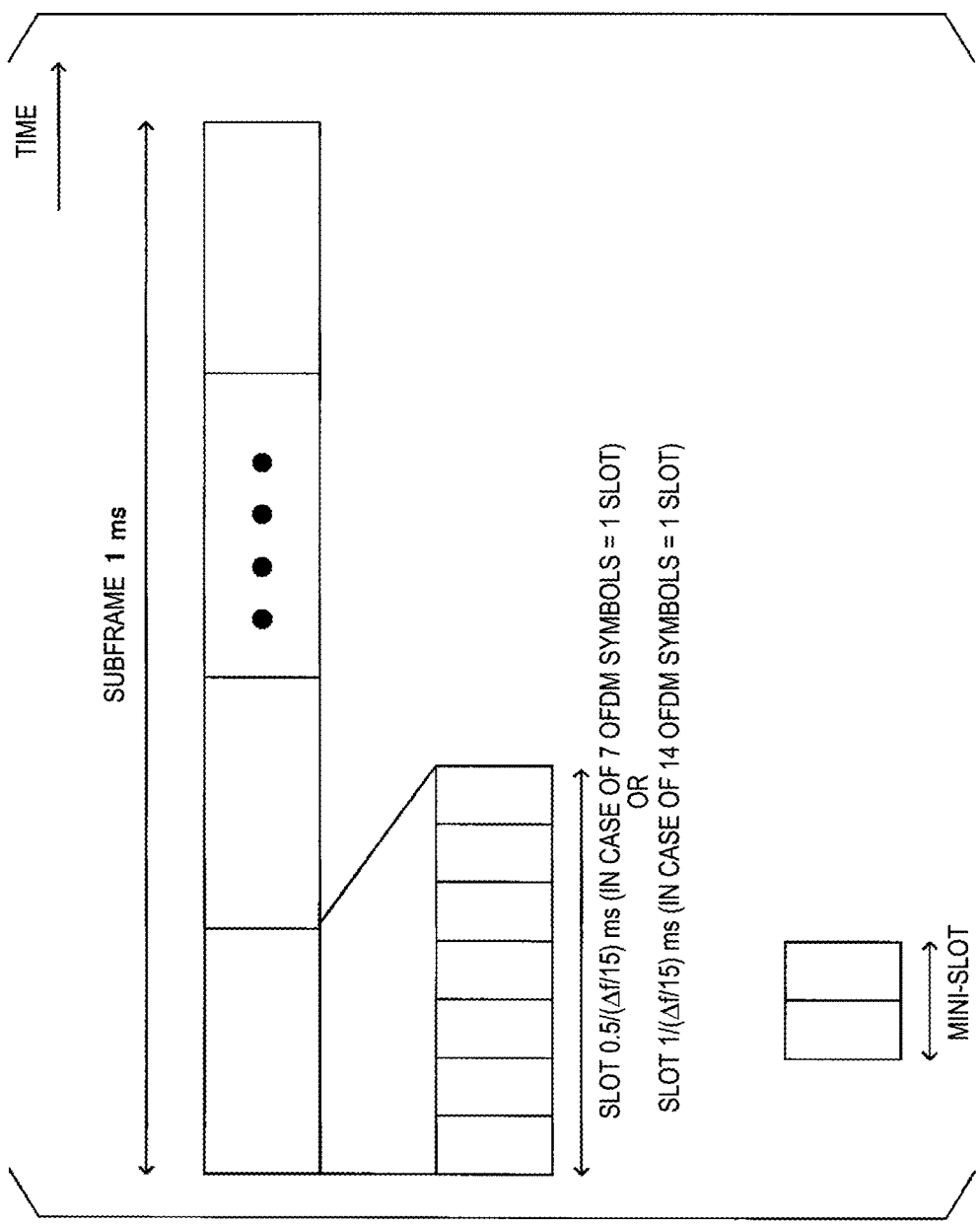
FIG. 5 is a diagram illustrating a relationship between a subframe, a slot, and a mini-slot in a time domain according to the embodiment of the present invention.

Next, the subframe, the slot, and the mini-slot will be described. FIG. 5 is a diagram illustrating a relationship between the subframe, the slot, and the mini-slot in the time domain. As illustrated in the drawing, three kinds of time units are defined. The subframe is 1 ms regardless of the subcarrier spacing, the number of OFDM symbols included in the slot is 7 or 14, and the slot length depends on the subcarrier spacing. Here, in the case of the subcarrier spacing of 15 kHz, 14 OFDM symbols are included in the one subframe. Thus, in a case that the subcarrier spacing is $\Delta f$ (kHz), the slot length may be defined as $0.5/(\Delta f/15)$ ms in the case that the number of OFDM symbols constituting one slot is 7. Here, $\Delta f$ may be defined by the subcarrier spacing (kHz). In the case that the number of OFDM symbols constituting one slot is 7, the slot length may be defined as $1/(\Delta f/15)$ ms. Here, $\Delta f$ may be defined by the subcarrier spacing (kHz). Furthermore, in a case that the number of OFDM symbols included in the slot is X, the slot length may be defined as $X/14/(\Delta f/15)$ ms.

The mini-slot (which may be referred to as a sub-slot) is a time unit including OFDM symbols that are less than the number of OFDM symbols included in the slot. The drawing illustrates a case that the mini-slot includes two OFDM symbols as an example. The OFDM symbol in the mini-slot may match an OFDM symbol timing that constitutes the slot. Note that a minimum unit of scheduling may be a slot or a mini-slot.

Figure 6:
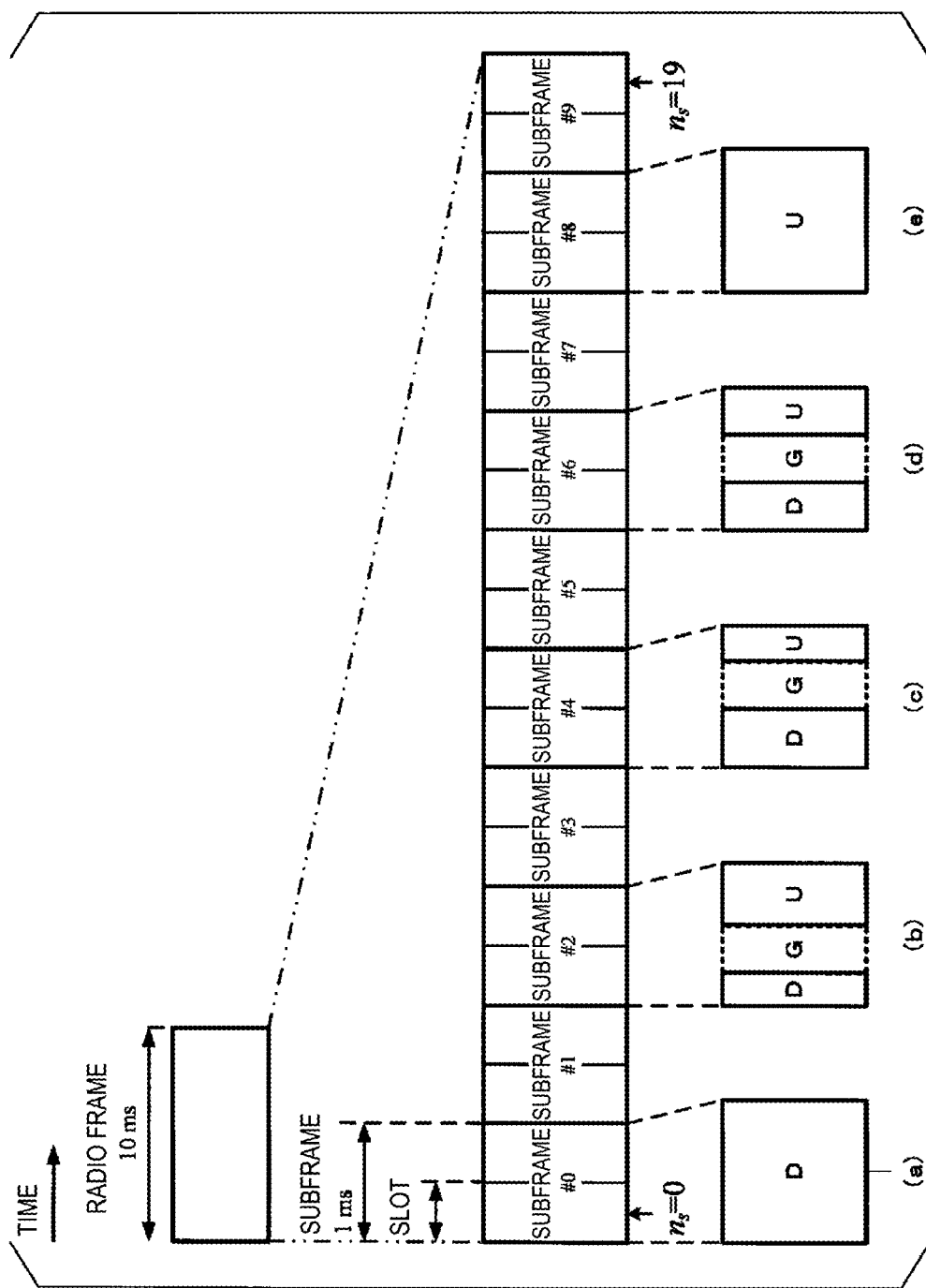
FIG. 6 is a diagram illustrating an example of a slot or a subframe according to the embodiment of the present invention.

FIG. 6 illustrates an example of the slot or the subframe (subframe type). Here, a case that the slot length is 0.5 ms with the subcarrier spacing 15 kHz is illustrated as an example. In the drawing, "D" represents the downlink, and "U" represents the uplink. As illustrated in the drawing, a certain time period (for example, a minimum time period to be allocated to one UE in the system) may include one or more of the followings:

a downlink part (duration),
a gap, and
a uplink part (duration).

(a) in FIG. 6 is an example in which a certain time period (which may be referred to as, for example, a minimum unit of time resource that can be allocated to one UE, a time unit, or the like, or multiple minimum units of time resource may be bundled and referred to as a time unit) is entirely used for downlink transmission. (b) in FIG. 6 illustrates an example in which the first time resource is used for an uplink scheduling via a PCCH, for example, and then, through a gap for a processing delay of the PCCH, a time for switching from a downlink to an uplink, and generation of a transmit signal, an uplink signal is transmitted. (c) in FIG. 6 illustrates an example in which the first time resource is used for a downlink PCCH and/or downlink PSCH transmission, and then, through a gap for a processing delay, a time for switching from a downlink to an uplink, and generation of a transmit signal, a PSCH or PCCH is transmitted. Here, as an example, the uplink signal may be used to transmit the HARQ-ACK and/or CSI, namely, the UCI. (d) in FIG. 6 illustrates an example in which the first time resource is used for a downlink PCCH and/or downlink PSCH transmission, and then, through a gap for a processing delay, a time for switching from a downlink to an uplink, and generation of a transmit signal, the uplink PSCH and/or PCCH is transmitted. Here, as an example, the uplink signal may be used to transmit the uplink data, namely, the UL-SCH. (e) in FIG. 6 illustrates an example in which the entire time resource is used for uplink transmission (uplink PSCH or PCCH).

The above-described downlink part and uplink part may include multiple OFDM symbols as is the case with LTE.

The LTE measurement will be described.

The base station apparatus 3 uses an RRC connection reconfiguration (RRCConnectionReconfiguration) message of the RRC signaling (radio resource control signalling) to transmit a Measurement configuration message to the terminal apparatus 2. The terminal apparatus 2 configures system information included in the Measurement configuration message, and in accordance with the notified system information, performs measurement, event evaluation, and measurement report for a serving cell and a neighbor cell (including a listed cell and/or a detected cell). The listed cell is a cell that is listed within a Measurement object (a cell notified as a neighbor cell list by the base station apparatus 3 to the terminal apparatus 2), and the detected cell is a cell that is detected by the terminal apparatus 2 on a frequency indicated by the Measurement object, but is not listed within the Measurement object (a cell detected by the terminal apparatus 2 itself and not notified as a neighbor cell list).

The measurement includes three types, intra-frequency measurements, inter-frequency measurements, and inter-radio access technology measurements (inter-RAT measurements). The intra-frequency measurements are a measurement at a downlink frequency in the serving cell. The inter-frequency measurements are a measurement at a frequency different from the downlink frequency in the serving cell. The inter-radio access technology measurements (inter-RAT measurements) are a measurement using a radio technology (e.g. UTRA, GERAN, CDMA2000, etc.) different from the radio technology in the serving cell (e.g. EUTRA). The inter-RAT measurements may include NR measurements.

The Measurement configuration message includes a measurement identifier (measId), Measurement object(s), addition and/or modification and/or deletion of Reporting configuration(s), a quantity configuration (quantityConfig), a measurement gap configuration (measGapConfig), a serving cell quality threshold (s-Measure), and the like.

Quantity Configuration (quantityConfig)

The quantity configuration (quantityConfig) specifies a layer-3 filtering coefficient (L3 filtering coefficient) in a case that the measurement object is EUTRA. The layer-3 filtering coefficient (L3 filtering coefficient) specifies a ratio between the latest measurement result and the past measurement result. The filtering result is used for the event evaluation in the terminal apparatus 2.

Measurement Gap Configuration (measGapConfig)

The measurement gap configuration (measGapConfig) is utilized to configure a measurement gap pattern or control activation/deactivation of a measurement gap. In the measurement gap configuration (measGapConfig), the gap pattern, a start system frame number (startSFN), and a start subframe number (startSubframeNumber) are notified as information for activating the measurement gap. The gap pattern specifies which pattern to use as a measurement gap. The start system frame number (startSFN) specifies a System Frame Number (SFN) for starting the measurement gap. The start subframe number (startSubframeNumber) specifies a subframe number for starting the measurement gap.

Serving Cell Quality Threshold (s-Measure)

The serving cell quality threshold (s-Measure) represents a threshold for the quality of the serving cell, and is used to control whether the terminal apparatus 2 needs to perform measurement. The serving cell quality threshold (s-Measure) is configured as a value for reference signal received power (RSRP).

Measurement Identifier (measId)

Here, the measurement identifier (measId) is utilized to link the Measurement object and the Reporting configuration, and specifically, to link a measurement object identifier (measObjectId) and a reporting configuration identifier (reportConfigId). The measurement identifier (measId) is associated with one measObjectId and one reporting configuration identifier (reportConfigId). The Measurement configuration message can make addition, modification, and deletion with respect to the relationship between the measurement identifier (measId), the Measurement object, and the Reporting configuration.

measObjectToRemoveList is a command to delete a specified measObjectID and a Measurement object corresponding to the specified measurement object identifier (measObjectID). At this time, all the measurement identifier (measId) associated with the specified measurement object identifier (measObjectID) are deleted. This command can simultaneously specify multiple measurement object identifiers (measObjectIds).

measObjectToAddModifyList is a command to modify a specified measurement object identifier (measObjectID) to a specified Measurement object, or to add a specified measurement object identifier (measObjectID) and a specified Measurement object. This command can simultaneously specify multiple measurement object identifiers (measObjectIds).

reportConfigToRemoveList is a command to delete a specified reporting configuration identifier (reportConfigId) and a Reporting configuration corresponding to the specified reporting configuration identifier (reportConfigId). At this time, all the measurement identifiers (measIds) associated with the specified reporting configuration identifier (reportConfigId) are deleted. This command can simultaneously specify multiple reporting configuration identifiers (reportConfigIds).

reportConfigToAddModifyList is a command to modify a specified reporting configuration identifier (reportConfigId) to a specified Reporting configuration, or to add a specified reporting configuration identifier (reportConfigId) and a specified Reporting configuration. This command can simultaneously specify multiple reporting configuration identifiers (reportConfigIds).

measIdToRemoveList is a command to delete the specified measurement identifier (measId). At this time, the measurement object identifier (measObjectID) and the reporting configuration identifier (reportConfigId) associated with the specified measurement identifier (measId) are maintained without being deleted. This command can simultaneously specify multiple measurement identifiers (measIds).

measIdToAddModifyList is a command to modify a specified measurement identifier (measId) to be associated with a specified measurement object identifier (measObjectId) and a specified reporting configuration identifier (reportConfigId), or to associate a specified measurement object identifier (measObjectId) and a specified reporting configuration identifier (reportConfigId) with a specified measurement identifier (measId) to add the specified measurement identifier (measId). This command can simultaneously specify multiple measurement identifiers (measIds).

Measurement Objects

The Measurement object is specified for each RAT and frequency. The Reporting configuration includes a specification for the EUTRA and a specification for the RAT other than the EUTRA.

The Measurement object includes a measurement object EUTRA (measObjectEUTRA), a measurement object UTRA (measObjectUTRA), a measurement object GERAN (measObjectGERAN), a measurement object CDMA2000 (measObjectCDMA2000), a measurement object WLAN (measObjectWLAN), and the like which are associated with the measurement object identifier (measObjectId). The Measurement object may include a measurement object NR (measObjectNR) associated with the measurement object identifier (measObjectId).

The measurement object identifier (measObjectId) is an identifier used to identify configurations of Measurement objects. The configuration of the Measurement object is specified for each Radio Access Technology (RAT) and for each frequency as described above. The Measurement object is otherwise specified for EUTRA, UTRA, GERAN, CDMA2000. The measurement object for EUTRA (measObjectEUTRA), which is a Measurement object for EUTRA, specifies information to be applied to a neighbor cell of the EUTRA. Any of the measurement objects for EUTRA (measObjectEUTRA) that has a different frequency is treated as a different Measurement object, and assigned with another measurement object identifier (measObjectId).

The measurement object for EUTRA (measObjectEUTRA) includes EUTRA carrier frequency information (eutra-CarrierInfo), a measurement bandwidth (measurementBandwidth), offset frequency (offsetFreq), information on a neighbor cell list (neighbour cell list), and information on a black list.

Next, information included in the measurement object for EUTRA (measObjectEUTRA) will be described. The EUTRA carrier frequency information (eutra-CarrierInfo) specifies a carrier frequency to be measured. The measurement bandwidth (measurementBandwidth) indicates a measurement bandwidth common to all neighbor cells operating at the carrier frequency to be measured. The offset frequency (offsetFreq) indicates a measurement offset value to be applied at the frequency to be measured.

The information on a neighbor cell list (neighbour cell list) includes information regarding event evaluations and neighbor cells to be subject to measurement report. The information on the neighbor cell list (neighbour cell list) includes a physical cell identifier (physical cell ID), a cell-specific offset (cellIndividualOffset, indicating a measurement offset value applied to the neighbor cell), and the like. In the case of the EUTRA, this information is used as information for adding, modifying, or deleting the neighbor cell list (neighbour cell list) which the terminal apparatus 2 has already acquired from the broadcast information (broadcast system information).

The information on a black list includes information regarding event evaluations and neighbor cells not to be subject to measurement report. The information on the black list includes a physical cell identifier (physical cell ID) and the like. In the case of the EUTRA, this information is used as information for adding, modifying, or deleting the black cell list (black listed cell list) which the terminal apparatus 2 has already acquired from the broadcast information.

Reporting Configurations

The Reporting configuration includes a report configuration EUTRA (reportConfigEUTRA) associated with a reporting configuration identifier (reportConfigId), and the like.

The reporting configuration identifier (reportConfigId) is an identifier used to identify a Reporting configuration related to the measurement. The Reporting configuration related to the measurement include a specification for the EUTRA and a specification for the RAT other than the EUTRA (UTRA, GERAN, CDMA2000) as described above. The report configuration EUTRA (reportConfigEUTRA), which is a Reporting configuration for the EUTRA, specifies triggering criteria of an event used for measurement report in the EUTRA.

The report configuration EUTRA (reportConfigEUTRA) includes an event identifier (eventId), a trigger quantity (triggerQuantity), a hysteresis, a trigger time (timeToTrigger), a report quantity (reportQuantity), the number of maximum report cells (maxReportCells), a report interval (reportInterval), and a report amount (reportAmount).

Next, the report configuration EUTRA (reportConfigEUTRA) will be described. The event identifier (eventId) is used to select criteria related to an event triggered reporting. Here, the event triggered reporting refers to a method for reporting a measurement in a case that the event triggered criteria are satisfied. Besides this, there is an event triggered periodic reporting in which the measurement is reported by a prescribed number of times at a constant interval in a case that the event triggered criteria are satisfied.

At least eight types described later are specified as the event triggered criterion. Specifically, in a case that the event triggered criteria specified by the event identifier (eventId) are satisfied, the terminal apparatus 2 performs a measurement report on the base station apparatus 3. The trigger quantity (triggerQuantity) is a quantity utilized to evaluate the event triggered criteria. Specifically, a Reference Signal Received Power (RSRP) or a Reference Signal Received Quality (RSRQ) are specified. That is, the terminal apparatus 2 measures the downlink reference signal by use of a quantity specified by the trigger quantity (triggerQuantity) to determine whether or not the event trigged criteria specified by the event identifier (eventId) are satisfied. The hysteresis is a parameter utilized in the event triggered criteria. The trigger time (timeToTrigger) indicates a period in which the event triggered criteria is to be met. The report quantity (reportQuantity) indicates a quantity reported in the measurement report. Here, the quantity specified by the trigger quantity (triggerQuantity), or the reference signal received power (RSRP) and the reference signal received quality (RSRQ) are specified. Here, the reference signal received quality (RSRQ) is a ratio expressed by (N*RSRP)/(EUTRA Carrier RSSI). A received signal strength (EUTRA Carrier RSSI) indicates a strength of the total received signal power, and the measurement bandwidth is the same as the system bandwidth. N is the number of Resource Block resource blocks (RBs) for the measured bandwidth of the received signal strength (EUTRA Carrier RSSI). The number of maximum report cells (maxReportCells) indicates the maximum number of cells included in the measurement report. The report interval (reportInterval) is used for the periodical reporting or the event triggered periodic reporting and is reported periodically at each interval indicated by the report interval (reportInterval). The report amount (reportAmount) specifies the number of times to perform the periodical reporting, if necessary.

Note that threshold parameters and offset parameters (a1_Threshold, a2_Threshold, a3_Offset, a4_Threshold, a5_Threshold1, a5_Threshold2, a6_Offset, c1_Threshold, and c2_Offset) utilized in the event triggered criteria described below are notified to the terminal apparatus 2 together with the event identifier (eventId) in the report configuration EUTRA (reportConfigEUTRA).

Event Triggered Criteria

Multiple event triggered criteria are defined for performing the measurement report, and each criterion has an entering condition and a leaving condition. In other words, the terminal apparatus 2 that satisfies the entering condition for the event specified by the base station apparatus 3 transmits a measurement report to the base station apparatus 3. In a case that the terminal apparatus 2 that satisfies the leaving condition for the event specified by the base station apparatus 3 is configured by the base station apparatus 3 to trigger the reporting in a case that the leaving condition is satisfied (in a case that reportOnLeave is included in the reporting configuration), the terminal apparatus 2 transmits a measurement report to the base station apparatus 3. The entering conditions and leaving conditions for each event are as below.

Event A1

Even A1 entering condition: $Ms-Hys > a1\_Threshold$
Event A1 leaving condition: $Ms+Hys < a1\_Threshold$ Event A2

Event A2 entering condition: $Ms-Hys < a2\_Threshold$
Event A2 leaving condition: $Ms+Hys > a2\_Threshold$ Event A3

Event A3 entering condition: $Mn+Ofn+Ocn-Hys > Ms+Ofs+Ocs+a3\_Offset$ Event A3 leaving condition: $Mn+Ofn+Ocn+Hys < Ms+Ofs+Ocs+a3\_Offset$ Event A4

Event A4 entering condition: $Mn+Ofn+Ocn-Hys > a4\_Threshold$ Event A4 leaving condition: $Mn+Ofn+Ocn+Hys < a4\_Threshold$ Event A5

Event A5 entering condition: $Ms-Hys < a5\_Threshold1$, $Mn+Ofn+Ocn-Hys > a5\_Threshold2$ Event A5 leaving condition: $Ms+Hys > a5\_Threshold1$, $Mn+Ofn+Ocn+Hys < a5\_Threshold2$ Event A6

Event A6 entering condition: $Mn+Ocn-Hys > Ms+Ocs+a6\_Offset$ Event A6 leaving condition: $Mn+Ocn+Hys < Ms+Ocs+a6\_Offset$ Event C1

Event C1 entering condition: $Mcr+Ocr-Hys > c1\_Threshold$ Event C1 leaving condition: $Mcr+Ocr+Hys > c1\_Threshold$ Event C2

Event C2 entering condition: $Mcr+Ocr-Hys > Mref+Oref+c2\_Offset$ Event C2 leaving condition: $Mcr+Ocr+Hys > Mref+Oref+c2\_Offset$ Here, Ms is a measurement result for the serving cell (not taking into account cell-specific measurement offset values). Mn is a measurement result for the neighbour cell. Mcr is a measurement result for the CSI-RS resource (not taking into account any measurement offset values). Mref is a measurement result of the reference CSI-RS resource (not taking into account any measurement offset values). The reference CSI-RS resource is defined as c2-RefCSI-RS notified by the measurement object for EUTRA (measObjectEUTRA). Hys is a hysteresis parameter for a targeted event.

Ofn is a frequency-specific measurement offset value for a frequency of the neighbor cell. Ofn corresponds to the offset frequency (offsetFreq) of the measurement object for EUTRA (measObjectEUTRA). In a case of the intra-frequency measurement, Ofn is the same as Ofs. In a case of the inter-frequency measurement, Ofn is the offset frequency (offsetFreq) included in the measurement object for EUTRA (measObjectEUTRA) corresponding to the downlink frequency different from the serving cell.

Ocs is a cell-specific measurement offset value for the neighbor cell. Ocn corresponds to the cell-specific offset (cellIndividualOffset) of the measurement object for EUTRA (measObjectEUTRA). In a case that Ocn is not configured, the measurement offset value is set to zero. In the case of the intra-frequency measurement, Ocn is the cell-specific offset (cellIndividualOffset) included in the measurement object for EUTRA (measObjectEUTRA) corresponding to the downlink frequency the same as the serving cell. In the case of the inter-frequency measurement, Ocn is the cell-specific offset (cellIndividualOffset) included in the measurement object for EUTRA (measObjectEUTRA) corresponding to the downlink frequency different from the serving cell.

Ocr is a CSI-RS specific measurement offset value. Ocr corresponds to a CSI-RS specific offset (csi-RS-IndividualOffset) in the measurement object for EUTRA (measObjectEUTRA) associated with the frequency of the CSI-RS resource. In a case that Ocr is not configured, the measurement offset value is set to zero.

Ofs is a frequency-specific offset value for a frequency of the serving cell. Ofs corresponds to the offset frequency (offsetFreq) of the measurement object for EUTRA (measObjectEUTRA).

Ocs is a cell-specific measurement offset value for the serving cell. Ocs is included in the cell-specific offset (cellIndividualOffset) of the measurement object for EUTRA (measObjectEUTRA) of the frequency of serving cell.

a1_Threshold is a threshold parameter used for the event A1. a2_Threshold is a threshold parameter used for the event A2. a3_Offset is an offset parameter used for the event A3. a4_Threshold is a threshold parameter used for the event A4. a5_Threshold 1 and a5_Threshold 2 are threshold parameters used for the event A5. a6_Offset is an offset parameter used for the event A6. c1_Threshold is a threshold parameter used for the event C1. c2_Offset is an offset parameter used for the event C2.

The terminal apparatus 2 generates each event by the measurement result Ms of the serving cell and the measurement result Mn of the neighbor cell. In a case that the measurement result Ms of the serving cell after the parameters are applied thereto is better than the threshold a1_Threshold, then event A1 occurs, and in a case of being worse than the threshold a2_Threshold, the event A2 occurs. In a case that the measurement result Mn of the neighbor cell after the parameters are applied thereto is better than the serving cell measurement result Ms and the offset a3_Offset, the event A3 occurs, and in a case that the measurement result Mn of the neighbor cell after the parameters are applied thereto is better than the threshold a4_Threshold, the event A4 occurs. In a case that the measurement result Ms of the serving cell after the parameters are applied thereto is worse than the threshold a5_Threshold1 and the measurement result Mn of the neighbor cell after the parameters are applied thereto is better than the threshold a5_Threshold2, the event A5 occurs.

In the reporting configuration InterRAT (reportConfigInterRAT), which is a Reporting configuration for RAT other than EUTRA, multiple triggering criteria for events that are utilized for reporting measurements in the RAT other than EUTRA are defined. For example, in a case that the measurement result of the neighbor cell (other RAT) after the parameters are applied thereto is better than the threshold b1_Threshold configured for each RAT, the event B1 occurs. In a case that the measurement result of the PCell after the parameters are applied thereto is worse than the threshold b2_Threshold1 and the measurement result of the neighbor cell (other RAT) after the parameters are applied thereto is better than the threshold b2_Threshold2 set for each RAT, the event B2 occurs.

Note that the base station apparatus 3 may give or may not give notice of the serving cell quality threshold (s-Measure). In a case that the base station apparatus 3 gives notice of the serving cell quality threshold (s-Measure), the terminal apparatus 2, and that the quality of the serving cell (RSRP value) is lower than the serving cell quality threshold (s-Measure), performs the neighbor cell measurement and the event evaluation (of whether or not the event triggered criteria are satisfied, also referred to as Reporting criteria evaluation). On the other hand, in a case that the base station apparatus 3 does not give notice of the serving cell quality threshold (s-Measure), the terminal apparatus 2 performs the neighbor cell measurement and the event evaluation regardless of the quality (RSRP value) of the serving cell.

Measurement Result

The terminal apparatus 2 that satisfies the event triggered criteria transmits a Measurement report to the base station apparatus 3. The Measurement report includes a Measurement result.

The Measurement result includes a measurement identifier (measId), a serving cell measurement result (measResultServing), and a EUTRA measurement result list (measResultListEUTRA). Here, the EUTRA measurement result list (measResultListEUTRA) includes a physical cell identifier (physicalCellIdentity) and a EUTRA cell measurement result (measResultEUTRA).

Here, the measurement identifier (measId) is an identifier utilized in the link between the measurement object identifier (measObjectID) and the reporting configuration identifier (reportConfigId) as described above. The serving cell measurement result (measResultServing) is a measurement result for serving cell, and reports the results of both the reference signal received power (RSRP) and the reference signal received quality (RSRQ) for the serving cell. The measurement result for the serving cell is always included in the measurement result. The physical cell identifier (physicalCellIdentity) is also utilized to identify the cell. The EUTRA cell measurement result (measResultEUTRA) is the measurement result for the EUTRA cell. The measurement result of the neighbor cell is included only at the occurrence of the associated event.

The NR measurement may use a measurement configuration and measurement report scheme equivalent to LTE. The NR Measurement configuration message may include a measurement identifier (measId), Measurement object(s), addition and/or modification and/or deletion of Reporting configuration(s), a quantity configuration (quantityConfig), a measurement gap configuration (measGapConfig), a serving cell quality threshold (s-Measure), and the like.

The measurement object NR (measObjectNR) may include some or all of NR carrier frequency information (eutra-CarrierInfo), a measurement bandwidth (measurementBandwidth), offset frequency (offsetFreq), information on a neighbor cell list (neighbour cell list), and information on a black list.

A reporting configuration NR (reportConfigNR) may include information on the event triggered reporting. The event triggered criteria may include at least events that are equivalent to the events A1 to A6 of LTE.

The reference signal received power (RSRP) may be replaced with the synchronization signal received power (SSRP) in a case that a synchronization signal is used for the measurement. Similarly, the reference signal received quality (RSRQ) may be replaced with the synchronization signal reception quality (SSRQ) in the case that a synchronization signal is used for the measurement.

An example of the NR measurement is described below. Note that information included in a message and/or a structure of the message are examples and are not limited thereto.

The base station apparatus 3 uses an RRC connection reconfiguration (RRCConnectionReconfiguration) message of the RRC signaling (radio resource control signal) to transmit a Measurement configuration message to the terminal apparatus 2. The terminal apparatus 2 configures system information included in the Measurement configuration message, and in accordance with the notified system information, performs measurement, event evaluation, and measurement report for a serving cell and a neighbor cell (including a listed cell and/or a detected cell). The listed cell is a cell that is listed within a Measurement object (a cell notified as a neighbor cell list by the base station apparatus 3 to the terminal apparatus 2), and the detected cell is a cell that is detected by the terminal apparatus 2 on a frequency indicated by the Measurement object, but is not listed within the Measurement object (a cell detected by the terminal apparatus 2 itself and not notified as a neighbor cell list).

The measurement includes three types, intra-frequency measurements, inter-frequency measurement, and inter-radio access technology measurement (inter-RAT measurement). The intra-frequency measurements are a measurement at a downlink frequency in the serving cell. The inter-frequency measurements are a measurement at a frequency different from the downlink frequency in the serving cell. The inter-RAT measurements are a measurement using a radio technology (e.g. EUTRA, UTRA, GERAN, CDMA2000, etc.) different from the radio technology in the serving cell (e.g. NR).

The Measurement configuration message includes a measurement identifier (measId), Measurement object(s), addition and/or modification and/or deletion of Reporting configuration(s), a quantity configuration (quantityConfig), a measurement gap configuration (measGapConfig), a serving cell quality threshold (s-Measure), and the like.

Quantity Configuration (quantityConfig)

The quantity configuration (quantityConfig) may specify a layer-3 filtering coefficient (L3 filtering coefficient) in a case that the Measurement object is NR or EUTRA. The layer-3 filtering coefficient (L3 filtering coefficient) specifies a ratio between the latest measurement result and the past measurement result. The filtering result is used for the event evaluation in the terminal apparatus 2.

Measurement Gap Configuration (measGapConfig)

The measurement gap configuration (measGapConfig) is utilized to configure a measurement gap pattern or control activation/deactivation of a measurement gap. In the measurement gap configuration (measGapConfig), the gap pattern, a start system frame (startSFN), and a start subframe number (startSubframeNumber) are notified as information for activating the measurement gap. The gap pattern specifies which pattern to use as a measurement gap. The start system frame (startSFN) specifies a System Frame Number (SFN) where the measurement gap starts. The start subframe number (startSubframeNumber) specifies a subframe number where the measurement gap starts. The measurement gap configuration may be configured independently for each cell or for each cell group.

Serving Cell Quality Threshold (s-Measure)

The serving cell quality threshold (s-Measure) represents a threshold for the quality of the serving cell, and is used to control whether the terminal apparatus 2 needs to perform measurement. The serving cell quality threshold (s-Measure) is configured as a value for the reference signal received power (RSRP) or the synchronization signal received power (SSRP).

Measurement Identifier (measId)

Here, the measurement identifier (measId) is utilized to link the Measurement object and the Reporting configuration, and specifically, to link a measurement object identifier (measObjectId) and a reporting configuration identifier (reportConfigId). The measurement identifier (measId) is associated with one measurement object identifier (measObjectID) and one reporting configuration identifier (reportConfigId). The Measurement configuration message can make addition, modification, and deletion with respect to the relationship between the measurement identifier (measId), the Measurement object, and the Reporting configuration.

measObjectToRemoveList is a command to delete a specified measurement object identifier (measObjectID) and a Measurement object corresponding to the specified measurement object identifier (measObjectID). At this time, all the measurement identifiers (measIds) associated with the specified measurement object identifier (measObjectID) are deleted. This command can simultaneously specify multiple measurement object identifiers (measObjectIds).

measObjectToAddModifyList is a command to modify a specified measurement object identifier (measObjectID) to a specified Measurement object, or to add a specified measurement object identifier (measObjectID) and a specified Measurement object. This command can simultaneously specify multiple measurement object identifiers (measObjectIds).

reportConfigToRemoveList is a command to delete a specified reporting configuration identifier (reportConfigId) and a Reporting configuration corresponding to the specified reporting configuration identifier (reportConfigId). At this time, all the measurement identifiers (measIds) associated with the specified reporting configuration identifier (reportConfigId) are deleted. This command can simultaneously specify multiple reporting configuration identifiers (reportConfigIds).

reportConfigToAddModifyList is a command to modify a specified reporting configuration identifier (reportConfigId) to a specified Reporting configuration, or to add a specified reporting configuration identifier (reportConfigId) and a specified Reporting configuration. This command can simultaneously specify multiple reporting configuration identifiers (reportConfigIds).

measIdToRemoveList is a command to delete the specified measurement identifier (measId). At this time, the measurement object identifier (measObjectID) and the reporting configuration identifier (reportConfigId) associated with the specified measurement identifier (measId) are maintained without being deleted. This command can simultaneously specify multiple measurement identifiers (measIds).

measIdToAddModifyList is a command to modify a specified measurement identifier (measId) to be associated with a specified measurement object identifier (measObjectId) and a specified reporting configuration identifier (reportConfigId), or to associate a specified measurement object identifier (measObjectId) and a specified reporting configuration identifier (reportConfigId) with a specified measurement identifier (measId) to add the specified measurement identifier (measId). This command can simultaneously specify multiple measurement identifiers (measIds).

Measurement Objects

The Measurement object is specified for each RAT and frequency. The Reporting configuration includes a specification for NR and a specification for the RAT other than NR.

The Measurement object includes a measurement object NR (measObjectNR), a measurement object EUTRA (measObjectEUTRA), a measurement object UTRA (measObjectUTRA), a measurement object GERAN (measObjectGERAN), a measurement object CDMA2000 (measObjectCDMA2000), a measurement object WLAN (measObjectWLAN), and the like which are associated with the measurement object identifier (measObjectId).

The measurement object identifier (measObjectID) is an identifier used to identify configurations of Measurement objects. The configuration of the Measurement object is specified for each Radio Access Technology (RAT) and for each frequency as described above. The Measurement object is otherwise specified for NR, EUTRA, UTRA, GERAN, CDMA2000. The measurement object NR (measObjectNR), which is a Measurement object for NR, specifies information to be applied to a neighbor cell of NR. Any of the measurement objects NR (measObjectNRs) that has a different frequency is treated as a different Measurement object, and assigned with another measurement object identifier (measObjectID).

The measurement object NR (measObjectNR) may include some or all of NR carrier frequency information (nr-CarrierInfo), a measurement bandwidth (measurementBandwidth), offset frequency (offsetFreq), information on a neighbor cell list (neighbour cell list), and information on a black list.

Next, information included in the measurement object NR (measObjectNR) will be described. The NR carrier frequency information (nr-CarrierInfo) specifies a carrier frequency to be measured. The measurement bandwidth (measurementBandwidth) indicates a measurement bandwidth common to all neighbor cells operating at the carrier frequency to be measured. The offset frequency (offsetFreq) indicates a measurement offset value to be applied at the frequency to be measured.

The information on a neighbor cell list (neighbour cell list) includes information regarding event evaluations and neighbor cells to be subject to measurement report. The information on the neighbor cell list (neighbour cell list) includes a physical cell identifier (physical cell ID), a cell-specific offset (cellIndividualOffset, indicating a measurement offset value applied to the neighbor cell), and the like. In the case of the NR, this information may be used as information for adding, modifying, or deleting the neighbor cell list (neighbour cell list) which the terminal apparatus 2 has already acquired from the broadcast information (broadcast system information).

The information on a black list includes information regarding event evaluations and neighbor cells not to be subject to measurement report. The information on the black list includes a physical cell identifier (physical cell ID) and the like. In the case of the NR, this information may be used as information for adding, modifying, or deleting the black cell list (black listed cell list) which the terminal apparatus 2 has already acquired from the broadcast information.

Reporting Configurations

The Reporting configuration includes a report configuration NR (reportConfigNR) associated with a reporting configuration identifier (reportConfigId), and the like.

The reporting configuration identifier (reportConfigId) is an identifier used to identify a Reporting configuration related to the measurement. The Reporting configuration related to the measurement include a specification for the NR and a specification for the RAT other than the NR (EUTRA, UTRA, GERAN, CDMA2000). The reporting configuration NR (reportConfigNR), which is a Reporting configuration for the NR, specifies triggering criteria of an event used for measurement report in the NR.

The reporting configuration NR (reportConfigNR) may include some or all of an event identifier (eventId), a trigger quantity (triggerQuantity), a hysteresis, a trigger time (timeToTrigger), a report quantity (reportQuantity), the number of maximum report cells (maxReportCells), a report interval (reportInterval), and a report amount (reportAmount).

Next, the reporting configuration NR (reportConfigNR) will be described. The event identifier (eventId) is used to select criteria related to an event triggered reporting. Here, the event triggered reporting refers to a method for reporting a measurement in a case that the event triggered criteria are satisfied. Besides, there is an event triggered periodic reporting in which the measurement is reported by a prescribed number of times at a constant interval in a case that the event triggered criteria are satisfied.

A least six types described later are specified as an event triggered criterion. In a case that the event triggered criteria specified by the event identifier (eventId) are satisfied, the terminal apparatus 2 performs a measurement report on the base station apparatus 3. The trigger quantity (triggerQuantity) is a quantity utilized to evaluate the event triggered criteria. That is, a synchronization signal received power (SSRP) or a synchronization signal reception quality (SSRQ) is specified. That is, the terminal apparatus 2 measures the downlink reference signal by use of a quantity specified by the trigger quantity (triggerQuantity) to determine whether or not the event trigged criteria specified by the event identifier (eventId) are satisfied. The hysteresis is a parameter utilized in the event triggered criteria. The trigger time (timeToTrigger) indicates a period in which the event triggered criteria should be met. The report quantity (reportQuantity) indicates a quantity reported in the measurement report. Here, the quantity specified by the trigger quantity (triggerQuantity), or the synchronization signal received power (SSRP) or the synchronization signal reception quality (SSRQ) are specified. Here, the synchronization signal reception quality (SSRQ) is a ratio expressed by (N*SSRP)/(NR Carrier RSSI). A received signal strength (NR Carrier RSSI) indicates a strength of the total received signal power, and the measurement bandwidth is the same as the system bandwidth. N is the number of Resource Block resource blocks (RBs) for the measured bandwidth of the received signal strength (NR Carrier RSSI). The number of maximum report cells (maxReportCells) indicates the maximum number of cells included in the measurement report. The report interval (reportInterval) is used for the periodical reporting or the event triggered periodic reporting and is reported periodically at each interval indicated by the report interval (reportInterval). The report amount (reportAmount) specifies the number of times to perform the periodical reporting, if necessary.

Note that threshold parameters and offset parameters (a1_Threshold, a2_Threshold, a3_Offset, a4_Threshold, a5_Threshold1, a5_Threshold2, a6_Offset) utilized in the event triggered criteria described below are notified to the terminal apparatus 2 together with the event identifier (eventId) in the reporting configuration NR (reportConfigNR).

Event Triggered Criteria

Multiple event triggered criteria are defined for performing the measurement report, and each criterion has an entering condition and a leaving condition. In other words, the terminal apparatus 2 that satisfies the entering condition for the event specified by the base station apparatus 3 transmits a measurement report to the base station apparatus 3. In a case that the terminal apparatus 2 that satisfies the leaving condition for the event specified by the base station apparatus 3 is configured by the base station apparatus 3 to trigger the reporting in a case that the leaving condition is satisfied (in a case that reportOnLeave is included in the reporting configuration), the terminal apparatus 2 transmits a measurement report to the base station apparatus 3. The entering conditions and leaving conditions for each event are as below.

Event A1

Even A1 entering condition: Ms−Hys>a1_Threshold
Event A1 leaving condition: Ms+Hys<a1_Threshold Event A2

Event A2 entering condition: Ms−Hys<a2_Threshold
Event A2 leaving condition: Ms+Hys>a2_Threshold Event A3

Event A3 entering condition: Mn+Ofn+Ocn−Hys>Ms+Ofs+Ocs+a3_Offset Event A3 leaving condition: Mn+Ofn+Ocn+Hys<Ms+Ofs+Ocs+a3_Offset Event A4

Event A4 entering condition: Mn+Ofn+Ocn−Hys>a4_Threshold Event A4 leaving condition: Mn+Ofn+Ocn+Hys<a4_Threshold Event A5

Event A5 entering condition: Ms−Hys<a5_Threshold1, Mn+Ofn+Ocn−Hys>a5_Threshold2 Event A5 leaving condition: Ms+Hys>a5_Threshold1, Mn+Ofn+Ocn+Hys<a5_Threshold2

Event A6

Event A6 entering condition: Mn+Ocn−Hys>Ms+Ocs+a6_Offset Event A6 leaving condition: Mn+Ocn+Hys<Ms+Ocs+a6_Offset Here, Ms is a measurement result for the serving cell (not taking into account cell-specific measurement offset values). Mn is a measurement result for the neighbor cell (neighbour cell). Hys is a hysteresis parameter for a targeted event.

Ofn is a frequency-specific measurement offset value for a frequency of the neighbor cell. Ofn corresponds to the offset frequency (offsetFreq) of the measurement object NR (measObjectNR). In a case of the intra-frequency measurement, Ofn is the same as Ofs. In a case of the inter-frequency measurement, Ofn is the offset frequency (offsetFreq) included in the measurement object NR (measObjectNR) corresponding to the downlink frequency different from the serving cell.

Ocn is a cell-specific measurement offset value for the serving cell. Ocn corresponds to the cell-specific offset (cellIndividualOffset) of the measurement object NR (measObjectNR). In a case that Ocn is not configured, the measurement offset value is set to zero. In the case of the intra-frequency measurement, Ocn is the cell-specific offset (cellIndividualOffset) included in the measurement object NR (measObjectNR) corresponding to the downlink frequency the same as the serving cell. In the case of the inter-frequency measurement, Ocn is the cell-specific offset (cellIndividualOffset) included in the measurement object for EUTRA (measObjectEUTRA) corresponding to the downlink frequency different from the serving cell.

Ofs is a frequency-specific offset value for a frequency of the serving cell. Ofs corresponds to the offset frequency (offsetFreq) of the measurement object NR (measObjectNR).

Ocs is a cell-specific measurement offset value for the serving cell. Ocs is included in the cell-specific offset (cellIndividualOffset) of the measurement object NR (measObjectNR) of the frequency of serving cell.

a1_Threshold is a threshold parameter used for the event A1. a2_Threshold is a threshold parameter used for the event A2. a3_Offset is an offset parameter used for the event A3. a4_Threshold is a threshold parameter used for the event A4. a5_Threshold 1 and a5_Threshold 2 are threshold parameters used for the event A5. a6_Offset is an offset parameter used for the event A6.

The terminal apparatus 2 generates each event by the measurement result Ms of the serving cell and the measurement result Mn of the neighbor cell. In a case that the measurement result Ms of the serving cell after the parameters are applied thereto is better than the threshold a1_Threshold, then event A1 occurs, and in a case of being worse than the threshold a2_Threshold, the event A2 occurs. In a case that the measurement result Mn of the neighbor cell after the parameters are applied thereto is better than the serving cell measurement result Ms and the offset a3_Offset, the event A3 occurs, and in a case that the measurement result Mn of the neighbor cell after the parameters are applied thereto is better than the threshold a4_Threshold, the event A4 occurs. In a case that the measurement result Ms of the serving cell after the parameters are applied thereto is worse than the threshold a5_Threshold1 and the measurement result Mn of the neighbor cell after the parameters are applied thereto is better than the threshold a5_Threshold2, the event A5 occurs.

In the Reporting configuration InterRAT (reportConfigInterRAT), which is a reporting configuration for RAT other than NR, the triggering criteria for events that are utilized for reporting measurements in the RAT other than NR may be defined. For example, in a case that the measurement result of the neighbor cell (other RAT) after the parameters are applied thereto is better than the threshold b1_Threshold set for each RAT, the event B1 may be generated. In a case that the measurement result of the PCell after the parameters are applied thereto is worse than the threshold b2_Threshold1 and the measurement result of the neighbor cell (other RAT) after the parameters are applied thereto is better than the threshold b2_Threshold2 set for each RAT, the event B2 may be generated.

Note that the base station apparatus 3 may give or may not give notice of the serving cell quality threshold (s-Measure). In a case that the base station apparatus 3 gives notice of the serving cell quality threshold (s-Measure), the terminal apparatus 2, and that the quality of the serving cell (RSRP value or SSRP value) is lower than the serving cell quality threshold (s-Measure), performs the neighbor cell measurement and the event evaluation (of whether or not the event triggered criteria are satisfied, also referred to as Reporting criteria evaluation). On the other hand, in a case that the base station apparatus 3 does not give notice of the serving cell quality threshold (s-Measure), the terminal apparatus 2 performs the neighbor cell measurement and the event evaluation regardless of the quality (RSRP value or SSRP value) of the serving cell.

Measurement Result

The terminal apparatus 2 that satisfies the event triggered criteria transmits a Measurement report to the base station apparatus 3. The Measurement report includes a Measurement result.

The Measurement result includes a measurement identifier (measId), a serving cell measurement result (measResultServing), and an NR measurement result list (measResultListNR). Here, the measResultListNR includes a physical cell identity (physicalCellIdentity) and an NR cell measurement result (measResultNR).

Here, the measurement identifier (measId) is an identifier utilized in the link between the measurement object identifier (measObjectID) and the reporting configuration identifier (reportConfigId) as described above. The serving cell measurement result (measResultServing) is a measurement result for serving cell, and may report the results of both the reference signal received power (SSRP) and the reference signal received quality (SSRQ) for the serving cell. The physical cell identifier (physicalCellIdentity) is also utilized to identify the cell. The NR cell measurement result (measResultNR) is the measurement result for the NR cell. The measurement result of the neighbor cell is included only at the occurrence of the associated event.

Next, a description is given of an example of, with a cell (first cell) of a first base station apparatus 3 being the primary cell of the master cell group, an operation of adding a cell (second cell) of a second base station apparatus 3 as a cell of the secondary cell group (e.g., primary secondary cell (PSCell)) in a state in which the terminal apparatus 2 in a connected state or an inactive state is in communication. The first base station apparatus 3 is also referred to as a Master eNB (MeNB) or a Master Node (MN). The second base station apparatus 3 is also referred to as a Secondary eNB (SeNB) or a Secondary Node (SN).

A case is described where a cell of the MCG including the first cell is a cell of LTE and a cell of the SCG including the second cell is a cell of LTE.

The first base station apparatus 3 configures, via the MCG SRB (MCG SRB), the measurement object EUTRA including the frequency of the cell that is a candidate for the primary secondary cell, and the reporting configuration EUTRA to the terminal apparatus 2 (step S71). The terminal apparatus 2 starts the measurement, based on the configured measurement object EUTRA and reporting configuration EUTRA (step S72), and reports the measurement report to the base station apparatus 3 via the MCG SRB, based on the triggered criteria of the reporting configuration EUTRA (step S73). The base station apparatus 3 selects the primary secondary cell, based on the measurement report (step S74). Further, the base station apparatus 3 may configure an additional measurement configuration to the terminal apparatus 2 to make the terminal apparatus 2 report the Cell Global Identity (CGI) for identifying a cell of interest. Note that the base station apparatus 3 may select the primary secondary cell by measures other than those described above.

The first base station apparatus 3 transmits, to the base station apparatus 3 (second base station apparatus 3) of the selected cell, a SeNB Addition Request message for requesting allocation of a radio resource (step S75). The SeNB Addition Request may include, as SCG-ConfigInfo, UE Capability, MCG radio resource configuration (radioResourceConfigDedMCG), MCG SCell information, and information on an SCG cell (PSCell and/or SCell) requested to be added which are used for reconfiguration by the SeNB. The MeNB may provide the most recent measurement result of the cell requested to be added. The MCG SCell information and the SCG cell information included in the SCG-ConfigInfo may include index (SCellIndex) information for identifying each cell. The MCG SCell information and the SCG cell information included in the SCG-ConfigInfo may include physical cell identifier information (physCellId) of the cell and downlink frequency information (dl-CarrierFreq) of the cell. In addition, an index (ServCellIndex) for identifying all serving cells including the SCellIndex and an index of the PCell (index 0) may be defined.

The base station apparatus 3 receiving the SeNB Addition Request, in a case that the resource request is acceptable, configures a radio resource configuration to be allocated to the terminal apparatus 2 as SCG-Config, and transmits a SeNB Addition Request Acknowledge message including the SCG-Config to the first base station apparatus 3 (step S76).

The first base station apparatus 3 receiving the SeNB Addition Request Acknowledge message, in case of endorsing the received radio resource configuration, transmits an RRC connection reconfiguration message including SCG radio resource configuration for the SCG-Config to the terminal apparatus 2 via an MCG SRB (step S77). The terminal apparatus 2 receiving the RRC connection reconfiguration message applies a new configuration to itself, and in a case of successful application, transmits an RRC connection reconfiguration complete (RRCConnectionReconfigurationComplete) message to the first base station apparatus 3 via an MCG SRB (step S78).

The first base station apparatus 3 receiving the RRC connection reconfiguration complete message may notify the second base station apparatus 3 that reconfiguration of the terminal apparatus 2 has successfully completed.

The terminal apparatus 2 transmitting the RRC connection reconfiguration complete message performs synchronization with the PSCell of the second base station apparatus 3 and starts communication in the PSCell (step S79). Note that the terminal apparatus 2 may perform synchronization with the PSCell of the second base station apparatus 3 before transmitting the RRC connection reconfiguration complete message.

The addition of the PSCell (SeNB) by the MeNB has been described above, but modification of the PSCell (SeNB) by the PCell can also be achieved by transmitting, by the MeNB, a SeNB Modification Request message including the SCG-ConfigInfo to the SeNB, based on the measurement report received from the terminal apparatus 2. Release of the PSCell (SeNB) by the PCell can also be achieved by transmitting, by the MeNB, a SeNB Release Request message to the SeNB, based on the measurement report received from the terminal apparatus 2. Change of the PSCell (SeNB) by the PCell can also be achieved by transmitting, by the MeNB, a SeNB Addition Request message to the SeNB after the change and a SeNB Release Request message to the SeNB before the change, based on the measurement report received from the terminal apparatus 2.

A case is described where a cell of the MCG including the first cell is a cell of NR and a cell of the SCG including the second cell is a cell of NR. In this case, the MCG and the SCG may be configured with RRC messages of NR. Parameters for the MCG and parameters for the SCG may be configured with RRC messages of NR using an MCG SRB. The parameters for the MCG may be transmitted directly using an MCG SRB. The parameters for the SCG may be transmitted directly using an SCG SRB. In this case, the terminal apparatus 2 may receive the reporting configuration for the SCG using the SCG SRB and receive the reporting configuration for the MCG using MCG SRB.

In this case, the PSCell can be added by a similar process, in the process of the case that a cell of the MCG is a cell of LTE and a cell of the SCG is a cell of LTE, by replacing the measurement object EUTRA and the reporting configuration EUTRA with the measurement object NR and the reporting configuration NR, respectively, and therefore, a detailed description thereof is omitted.

A description will be given of a case of a certain configuration. In this case, a cell of the MCG including the first cell may be a cell of LTE (E-UTRAN) and a cell of the SCG including the second cell may be a cell of NR. Parameters for the MCG may be configured with the RRC messages of EUTRAN, and parameters for the SCG may be configured with the RRC messages of NR included in the RRC messages of EUTRAN. The parameters for the MCG included in the RRC message of EUTRAN may be transmitted directly using an MCG SRB. The parameters for the SCG included in the RRC message of NR may be transmitted directly using an SCG SRB. In this case, the terminal apparatus 2 receives the reporting configuration for the SCG using the SCG SRB and receives the reporting configuration for the MCG using the MCG SRB.

The terminal apparatus 2 is configured with the measurement object NR including the frequency of the NR cell and the reporting configuration InterRAT from the first base station apparatus 3 via the MCG SRB. The frequency of the NR cell may be used to select the candidate for the primary secondary cell. The terminal apparatus 2 starts the measurement, based on the configured measurement object NR and reporting configuration InterRAT, and reports the measurement report to the base station apparatus 3 via the MCG SRB, based on the triggering criteria of the reporting configuration InterRAT. The base station apparatus 3 selects the primary secondary cell, based on the measurement report. Further, the base station apparatus 3 may configure an additional measurement configuration to the terminal apparatus 2 to make the terminal apparatus 2 report the Cell Global Identity (CGI) for identifying a cell of interest. Note that the base station apparatus 3 may select the primary secondary cell by measures other than those described above.

The first base station apparatus 3 (MN) transmits, to the base station apparatus 3 (second base station apparatus 3, SN candidate) of the selected cell, an SN Addition Request message for requesting allocation of a radio resource. The SN Addition Request may include, as SCG-ConfigInfo, UE Capability, MCG radio resource configuration (radioResourceConfigDedMCG), current SCell configuration information for the MCG (sCellToAddModListMCG), information on an SCG cell requested to be added (sCellToAddModListSCG), and information on an SCG cell requested to be released (sCellToReleaseListSCG) which are used for reconfiguration by the SN. The MN may provide the most recent measurement result of the cell requested to be added. The MCG SCell information and the SCG cell information included in the SCG-ConfigInfo may include index (SCellIndex) information for identifying each cell. The SCG-ConfigInfo may include information indicating a value or range of the SCellIndex that can be used in the SCG. This allows the SN to configure the SCellIndex independently from the MN without the SCellIndex overlapping those of the MCG. The information indicating a value or range of the SCellIndex that can be used in the SCG may be notified from the MN to the SN through another message. Information regarding the number of SCells used in the SCG may be notified from the SN to the MN. The MCG SCell information and the SCG cell information included in the SCG-ConfigInfo may include physical cell identifier information (physCellId) of the cell and downlink frequency information (dl-CarrierFreq) of the cell. In addition, an index (ServCellIndex) for identifying all serving cells including the SCellIndex and an index of the PCell (index 0) may be defined.

The base station apparatus 3 receiving the SN Addition Request, in a case that the resource request is acceptable, configures a radio resource configuration to be allocated to the terminal apparatus 2 as SCG-Config, and transmits an SN Addition Request Acknowledge message including the SCG-Config to the first base station apparatus 3.

The first base station apparatus 3 receiving the SN Addition Request Acknowledge message, in a case of endorsing the received radio resource configuration, transmits an RRC connection reconfiguration message including SCG radio resource configuration for the SCG-Config to the terminal apparatus 2 via an MCG SRB. The terminal apparatus 2 receiving the RRC connection reconfiguration message applies a new configuration to itself, and in a case of successful application, transmits an RRC connection reconfiguration complete message to the first base station apparatus 3 via an MCG SRB.

The terminal apparatus 2 receiving the RRC connection reconfiguration message including the SCG radio resource configuration for the SCG-Config, in a case that an SCG SRB is configured, may transmit a response for the SCG radio resource configuration for the SCG-Config via an SCG SRB. To be more specific, in a case that an SCG SRB is configured and the SCG SRB is configured to be used for a response for the SCG-Config, the response for the SCG radio resource configuration for the SCG-Config may be transmitted via the SCG SRB. For example, the terminal apparatus 2 receiving the RRC connection reconfiguration message including the SCG radio resource configuration for the SCG-Config applies a new configuration except for the SCG-Config to itself, and in a case of successful application, transmits an RRC connection reconfiguration complete message to the first base station apparatus 3 via an MCG SRB. The terminal apparatus 2 receiving the RRC connection reconfiguration message including the SCG radio resource configuration for the SCG-Config applies a new configuration of the SCG-Config to itself, and in a case of successful application, transmits an SCG RRC connection reconfiguration complete message to the second base station apparatus 3 via an SCG SRB.

The first base station apparatus 3 receiving the RRC connection reconfiguration complete message notifies the second base station apparatus 3 that reconfiguration of the terminal apparatus 2 has successfully completed.

The terminal apparatus 2 transmitting the RRC connection reconfiguration complete message performs synchronization with the PSCell of the second base station apparatus 3 and starts communication in the PSCell. Note that the terminal apparatus 2 may perform synchronization with the PSCell of the second base station apparatus 3 before transmitting the RRC connection reconfiguration complete message.

The addition of the PSCell (SN) by the MN has been described above, but modification of the PSCell (SN) by the PCell can also be achieved by transmitting, by the MN, an SN Modification Request message including the SCG-ConfigInfo to the SN. Release of the PSCell (SN) by the PCell can also be achieved by transmitting, by the MN, an SN Release Request message to the SN. Change of the PSCell (SN) by the PCell can also be achieved by transmitting, by the MN, an SN Addition Request message to the SN after the change and an SN Release Request message to the SN before the change.

The modification, release, and change of the PSCell (SN) by the SN will be described.

For example, in a case that the MN and the SN directly configure the measurement configurations to the terminal apparatus 2 via the MCG SRB and the SCG SRB, respectively, and receive the measurement reports from the terminal apparatus 2, the SN may be able to recognize that the PSCell required to be modified, released, or changed.

In a case that the PSCell required to be modified, the SN may transmit an SN Modification Required message including the SCG-Config to the MN to notify the MN of information required for SN modification. Based on this information, the MN can perform the modification of the PSCell by the MN. In the case that the configuration to the terminal apparatus 2 (RRCConnectionReconfiguration) is successful, the MN may transmit an SN Modification Confirm message to the SN.

In a case that the PSCell is required to be released, the SN may transmit an SN Release Required message to the MN to notify the MN that SN release is required. Based on this information, the MN can perform the release of the PSCell by MN. The MN may transmit an SN Release Confirm message to the SN.

In a case that the PSCell is required to be changed accompanied by the SN being changed, the SN may transmit an SN Change Required message including a part of the information of the SCG-ConfigInfo (e.g., information on the SCG cell of the SN after changed (sCellToAddModList-SCG) to the MN to notify the MN of information required for SN change. Based on this information, the MN can transmit an SN Addition Request message to the SN after the change, and, in a case of successful addition request, can transmit an SN release message to the SN before the change.

Next, a description is given of an example of, with a cell (first cell) of the first base station apparatus 3 (MN) being the primary cell of the master cell group and a cell (second cell) of the second base station apparatus 3 (SN) being the primary secondary cell of the secondary cell group, an operation of adding the SCell of the master cell group or the secondary cell group in the state in which the terminal apparatus 2 in a connected state or an inactive state is in communication. However, this operation is not limited to the purpose of adding the SCell of the master cell group or the secondary cell group.

In a case that the MN adds the SCell in the MCG, SCellIndex that does not overlap SCellIndex already assigned to the MCG SCell or SCellIndex already assigned to the SCG SCell is selected and assigned to an added cell. The SCell configuration information for the MCG including the added SCell may be included in the sCellToAddModListMCG of the SCG-ConfigInfo and notified to the SN.

Figure 7:
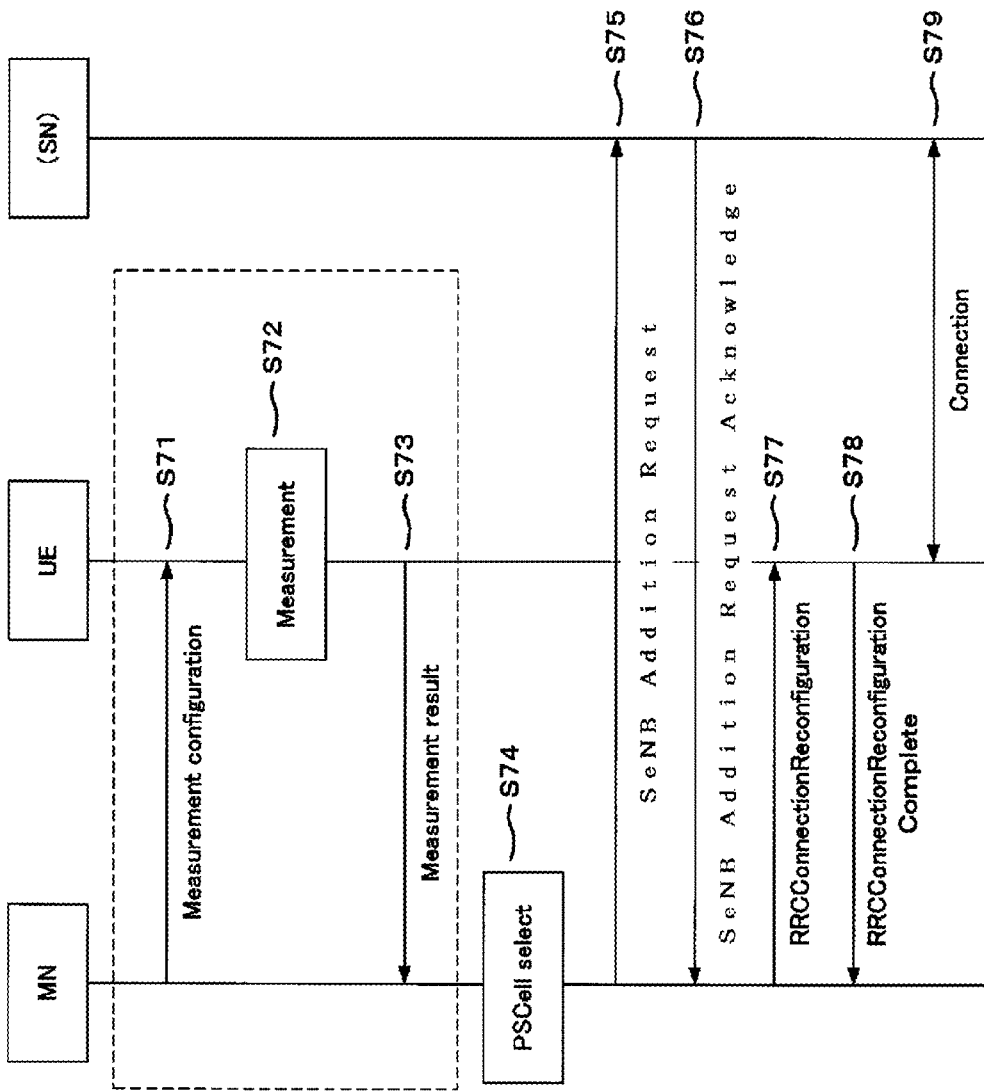
FIG. 7 is a diagram illustrating an example of an operation related to PSCell (SN) addition according to the embodiment of the present invention.
Figure 8:
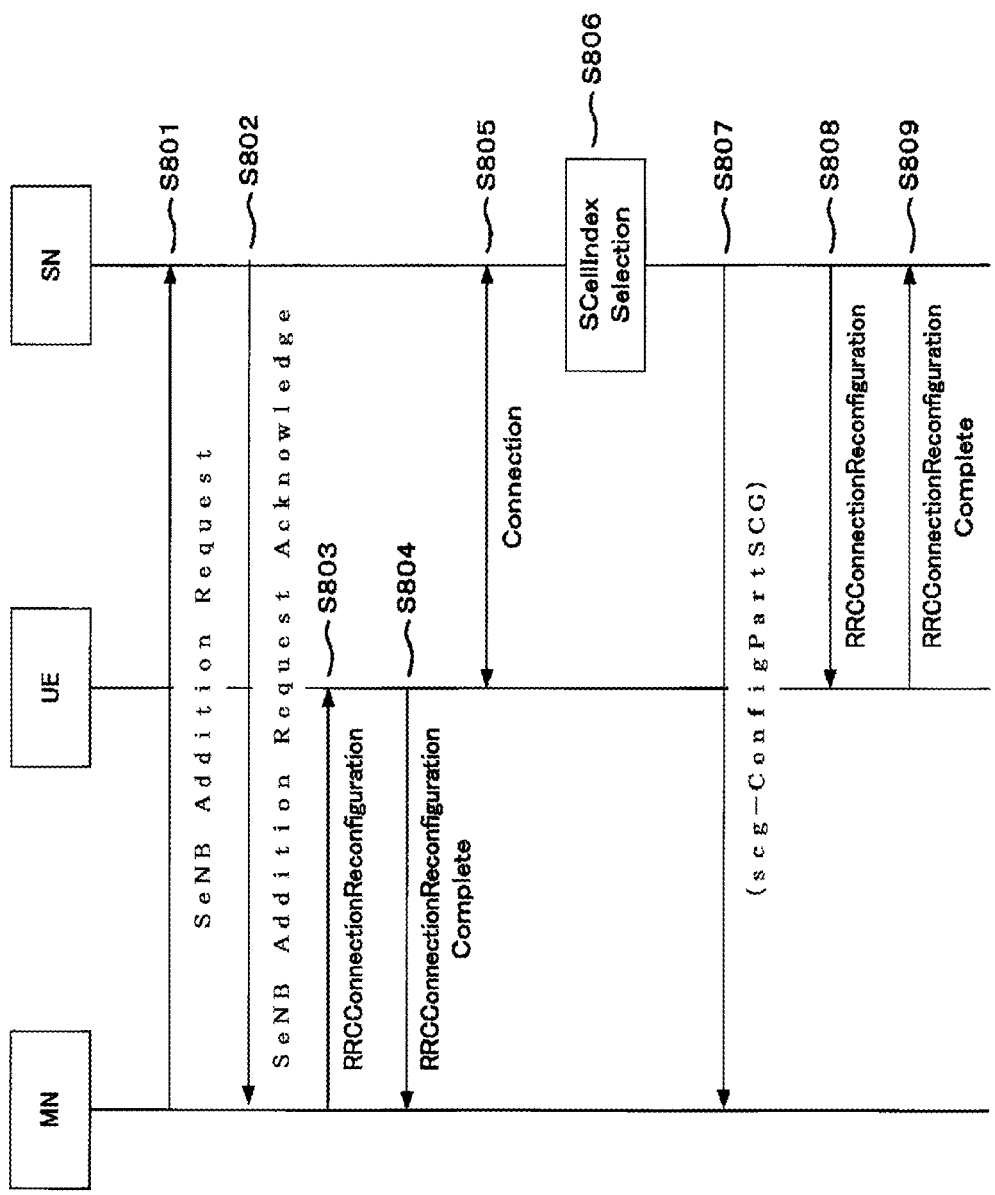
FIG. 8 is a diagram illustrating an example of an operation of an SN related to SCell addition according to the embodiment of the present invention.

A case is described that the SN adds the SCell in the SCG, and the SN Addition Request message which is previously received includes a list of values of or a range of a value of the SCellIndex that can be used in the SCG, with reference to FIG. 8. First, the list of values of or the range of a value of the SCellIndex that can be used in the SCG is notified to the SN through the SN Addition Request message of a list of SCellIndex values or a range of values that can be used in SCG (step S801), and an SN addition procedure is completed by a procedure the same as from step S76 to step S79 in FIG. 7 (step S802 to step S805). The SN selects the SCellIndex that does not overlap SCellIndex already assigned to the SCG SCell from the list of values or the range of a value, and assigns the selected SCellIndex to the added cell (step S806). The SCell configuration information for the SCG including the added SCell may be included in the SCG-ConfigInfo or scg-ConfigPartSCG of the SCG-Config and notified to the MN (step S807). The SN transmits an RRC connection reconfiguration message including the SCell configuration information (such as an SCG RRC connection reconfiguration message) to the terminal apparatus 2 (step S808). The terminal apparatus 2 configured with the SCell transmits an RRC connection reconfiguration complete message (such as an SCG RRC connection reconfiguration complete message) to the SN via an SCG SRB (step S809). This can prevent Index duplication and can reduce signaling between the MN and the SN in adding the SCell. Note that the transmission of the RRC connection reconfiguration message at of step S808 may be performed by the MN via an MCG SRB, and the terminal apparatus 2 may transmit the RRC connection reconfiguration complete message to the MN via the MCG SRB at step S809. The list of values of or the range of a value of the SCellIndex that can be used in the SCG may be predetermined in specifications or the like.

Figure 9:
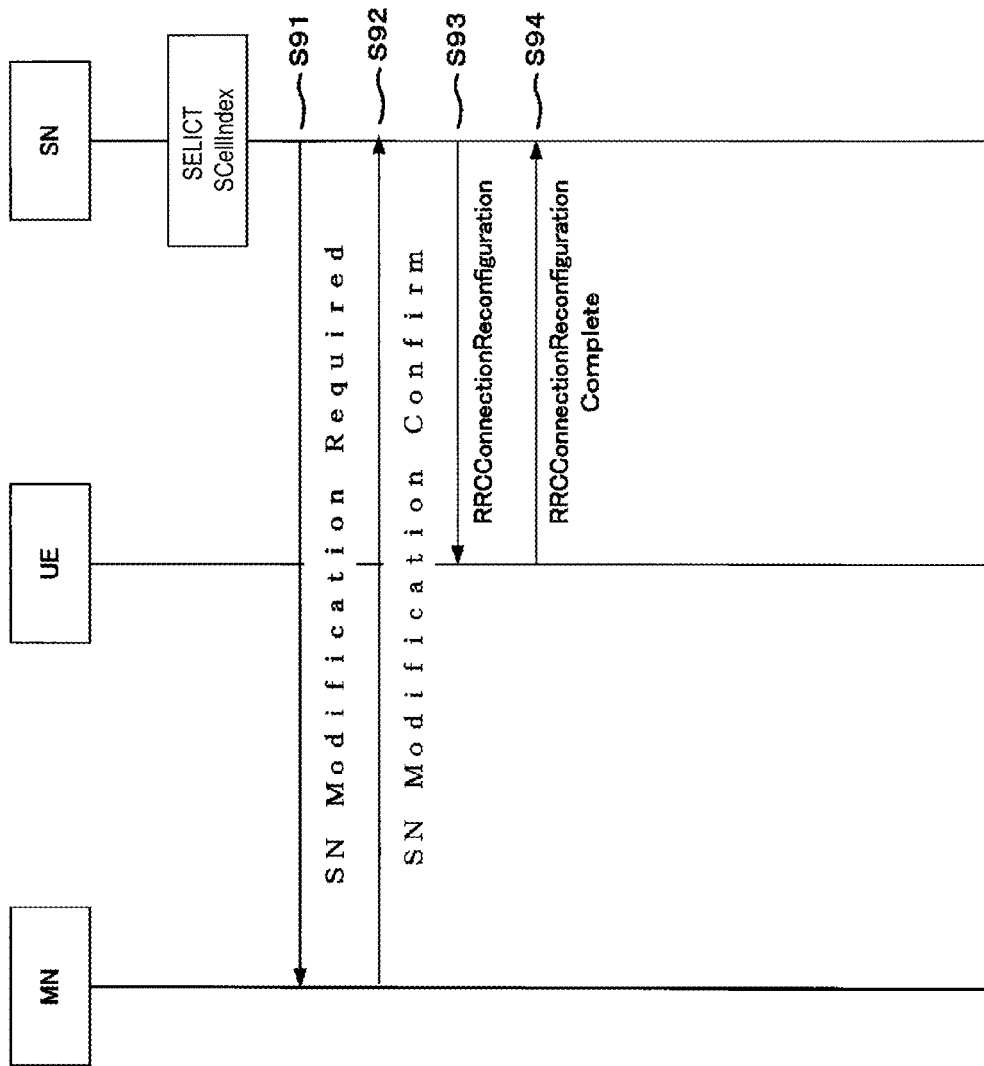
FIG. 9 is a diagram illustrating an example of an operation of the SN related to SCell addition according to the embodiment of the present invention.

A case is described that the SN adds the SCell in the SCG, and the SN Addition Request message which is previously received does not include the list of values of or the range of a value of the SCellIndex that can be used in the SCG, with reference to FIG. 9. The SN selects the SCellIndex that does not overlap SCellIndex already assigned to the MCG SCell or SCellIndex already assigned to the SCG SCell, and transmits an SN Modification Required message including information on the selected SCellIndex to the MN (step S91). In a case that the SCellIndex which the MN receives from the SN overlaps another (MCG) SCell, the MN may transmit an SN Modification Confirm messages including a new Index that does not overlap other SCellIndex to the SN (step S92). The MN may transmit the SN Modification Confirmation message without changing the SCellIndex to the SN even in a case that the SCellIndex does not overlap. The information included in the SN Modified Confirmation message may be the SCG-ConfigInfo including the information on the added SCell. Alternatively, the SN may not select the SCellIndex and notify information other than the SCellIndex of the added SCell in the SN Modification Required message (e.g., the physical cell identifier or downlink carrier frequency information of the cell), with the Index selected by the MN being the SCellIndex. The SN transmits an RRC connection reconfiguration message including the SCell configuration information (such as an SCG RRC connection reconfiguration message) to the terminal apparatus 2 via an SCG SRB (step S93). The terminal apparatus 2 configured with the SCell transmits an RRC connection reconfiguration complete message (such as an SCG RRC connection reconfiguration complete message) to the SN via the SCG SRB (step S94). This can prevent Index duplication and can reduce signaling between the MN and the SN in adding the SCell. Note that the transmission of the RRC connection reconfiguration message at of step S93 may be performed by the MN via an MCG SRB, and the terminal apparatus 2 may transmit the RRC connection reconfiguration complete message to the MN via the MCG SRB at step S94.

As described above, the configuration of the SCell added by the MN and/or SN is notified to the terminal apparatus 2 through the RRC connection reconfiguration message. The RRC connection reconfiguration message may be configured from the MN in the case of for adding the MCG SCell. The RRC connection reconfiguration message may be configured from the MN or the SN in the case of adding the SCG SCell.

Note that in a case that the terminal apparatus 2 is configured, via the SCG SRB, with the Index the same as the SCellIndex configured via the MCG SRB, the terminal apparatus 2 may notify the MN that the configuration has failed through an SCG failure information (SCGFailureInformation) message using an MCG SRB. In the case that the terminal apparatus 2 is configured, via the SCG SRB, with the Index the same as the SCellIndex configured via the MCG SRB, the terminal apparatus 2 may notify the SN that the configuration has failed through an SCG reconfiguration failure (SCG RRCConnectionReconfigurationFailure) message using an SCG SRB.

Note that in a case that the terminal apparatus 2 is configured, via the MCG SRB, with the Index the same as the SCellIndex configured via the SCG SRB, the terminal apparatus 2 may overwrite with the configuration configured via the MCG SRB, and notify the MN that the configuration has failed through an SCG failure information (SCGFailureInformation) message using an MCG SRB. In a case that the terminal apparatus 2 is configured, via the MCG SRB, with the Index the same as the SCellIndex configured via the SCG SRB, the terminal apparatus 2 may overwrite with the configuration configured via the MCG SRB, and notify the SN that the configuration has failed through an SCG reconfiguration failure (SCG RRCConnectionReconfiguration-Failure) message using an SCG SRB.

Next, a description is given of an example of, with a cell (first cell) of the first base station apparatus 3 (MN) being the primary cell of the master cell group and a cell (second cell) of the second base station apparatus 3 (SN) being the primary secondary cell of the secondary cell group, an operation of modifying the SCell of the master cell group or the secondary cell group in the state in which the terminal apparatus 2 in a connected state or an inactive state is in communication. However, this operation is not limited to the purpose of modifying the SCell of the master cell group or the secondary cell group.

In a case that the MN modifies the SCell in the MCG, the SCell configuration information for the MCG including the modified SCell may be included in the sCellToAddMod-ListMCG of the SCG-ConfigInfo and notified from the MN to the SN.

In a case that the SN modifies the SCell in the SCG, the SCell configuration information for the SCG including the modified SCell may be included in the SCG-ConfigInfo or scg-ConfigPartSCG of the SCG-Config and notified from the SN to the MN.

As described above, the configuration of the SCell modified by the MN and/or the SN is notified to the terminal apparatus 2 through the RRC connection reconfiguration message. The RRC connection reconfiguration message may be configured from the MN via an MCG SRB in the case of for adding the MCG SCell. The RRC connection reconfiguration message may be configured from the MN or the SN via a respective SRB (MCG SRB or SCG SRB) in the case of adding the SCG SCell.

Next, a description is given of an example of, with a cell (first cell) of the first base station apparatus 3 (MN) being the primary cell of the master cell group and a cell (second cell) of the second base station apparatus 3 (SN) being the primary secondary cell of the secondary cell group, an operation of releasing the SCell of the master cell group or the secondary cell group in the state in which the terminal apparatus 2 in a connected state or an inactive state is in communication. However, this operation is not limited to the purpose of releasing the SCell of the master cell group or the secondary cell group.

In a case that the MN releases the SCell in the MCG, the SCell configuration information for the MCG including the released SCell may be included in the sCellToAddMod-ListMCG of the SCG-ConfigInfo and notified from the MN to the SN.

In a case that the SN releases the SCell in the SCG, the SCell configuration information for the SCG including the released SCell may be included in the SCG-ConfigInfo or scg-ConfigPartSCG of the SCG-Config and notified from the SN to the MN.

Alternatively, in the case that the SN releases the SCell in the SCG, information on the released SCellIndex is included in an SN Modification Required message and transmitted to the MN. The MN may transmit an SN Modification Confirm message including the SCG-ConfigInfo which is received from the SN and includes the SCell information on the released SCell.

As described above, the configuration of the SCell released by the MN and/or the SN is notified to the terminal apparatus 2 through the RRC connection reconfiguration message. The RRC connection reconfiguration message may be configured from the MN via an MCG SRB in the case of for releasing the MCG SCell. The RRC connection reconfiguration message may be configured from the MN or the SN via a respective SRB (MCG SRB or SCG SRB) in the case of releasing the SCG SCell.

An example of the RRC connection reconfiguration message will be described using FIG. 10.

As illustrated in FIG. 10, the RRC connection reconfiguration message may include some or all of (10A) rrc-TransactionIdentifier, (10B) measConfig, (10C) mobilityControlInfo, (10D) dedicatedInfoNASList, (10E) radioResourceConfigDedicated, (10F) securityConfigHO, (10G) otherConfig, (10H) fullConfig, (10I) sCellToReleaseList, (10J) sCellToAddModList, and (10K) systemInfomationBlockDedicated.

(10A) rrc-TransactionIdentifier is an element used to identify RRC procedures (transactions) and has a value of an integer from 0 to 3, for example. (10B) measConfig is information for configuring a measurement Performed by the terminal apparatus 2 and may include a configuration of a gap period for measurement. (10D) dedicatedInfoNASList is a list of NAS layer information specific to the terminal apparatus 2 exchanged between the network and the terminal apparatus 2 and includes NAS layer information for each DRB, and the RRC layer transmits this information to the higher layer (NAS layer) transparently. (10E) radioResourceConfigDedicated may include information used to configure, change, and/or release the SRB and DRB, information for changing a MAC layer configuration, information about a channel configuration for the physical layer, and the like. (10F) securityConfigHO is a configuration for security, and may include, for example, a configuration of an Integrity Protection algorithm in AS layers of the SRB, a configuration of a Ciphering algorithm of the SRB and/or the DRB, and the like. (10H) fullConfig is information indicating whether or not a specific option is applied to this RRC connection reconfiguration message, and the terminal apparatus 2 may apply a configuration included in a specific element in a case that (10H) fullConfig is included in the RRC connection reconfiguration message. (10I) sCellToReleaseList and (10J) sCellToAddModList may include information used to add, modify, and/or release the secondary cell. (10K) systemInfomationBlockDedicated may include a portion of the notification information for the target cell.

(10C) mobilityControlInfo includes parameters necessary for the mobility by the network control (e.g., handover). (10C) mobilityControlInfo may include some or all of targetPhysCellId, carrierFreq, carrierBandwidth, t304, newUE-Identity, radioResourceConfigCommon, and rach-ConfigDedicated. (10C) mobilityControlInfo may also include various other information.

targetPhysCellId indicates an identifier of the target cell (e.g., a physical cell identifier). carrierFreq indicates information on the frequency used by the terminal apparatus 2 in the target cell. carrierBandwidth indicates information on the downlink and/or uplink bandwidth of the target cell. t304 indicates a value of a timer for the handover, and for example, the terminal apparatus 2 may perform the predetermined process in a case that the handover is not successfully completed within a time indicated by the timer. newUE-Identity indicates a new identifier (e.g., C-RNTI) of the terminal apparatus 2 in the target cell.

radioResourceConfigCommon includes information used to Specify common radio resource configurations, such as random access parameters and static physical layer parameters.

rach-ConfigDedicated includes information used to specify individual random access parameters allocated to the terminal apparatus 2. For example, rach-ConfigDedicated may include some or all of information explicitly indicating the format or time/frequency resource of the random access preamble, and/or information on numerologies used to transmit the preamble.

(10G) otherConfig includes some or all of the other configurations.

An example of the secondary cell group configuration (SCG-Configuration) included in the RRC connection reconfiguration message will be described using FIG. 11.

As illustrated in FIG. 11, the secondary cell group configuration may include some or all of (11A) scg-ConfigPartMCG and (11B) scg-ConfigPartSCG.

(11A) scg-ConfigPartMCG is a configuration associated with also the master cell group in a case that the secondary cell group configuration is configured, and may include, for example, information about updating of key information and/or information about power of master cell groups and secondary cell groups, and the like. (11B) scg-ConfigPartSCG is a secondary cell group configuration, and may include, for example, (12A) radioResourceConfigDedicatedSCG, pSCellToAddMod, (12C) sCellToAddModListSCG, (12D) sCellToReleaseListSCG, and/or (12E) mobilityControlInfoSCG, as illustrated in FIG. 12.

(12A) radioResourceConfigDedicatedSCG is a radio resource configuration specific to the terminal apparatus 2 for the SCG, and may include information for adding/changing the DRB, MAC layer configuration information, a timer configuration value, and/or constant information. (12B) pSCellToAddMod is addition/modification information of a cell to be the PSCell, and may include index information for identifying the SCell (PSCell), an identifier of the cell (e.g., a physical cell identifier or cell global identifier), downlink carrier frequency information, a common radio resource configuration for the PSCell, and/or information on a radio resource configuration specific to the terminal apparatus 2 in the PSCell.

(12C) sCellToAddModListSCG is addition/modification information of a cell to be the SCell of the secondary cell group and may include one or more lists of SCell information. Furthermore, each piece of SCell information may include SCell index information for identifying the SCell, an identifier of the cell (e.g., a physical cell identifier or a cell global identifier), downlink carrier frequency information, and/or information on a common radio resource configuration for the SCell. (12D) sCellToReleaseListSCG is information for releasing the SCell of the secondary cell group, and may include one or more lists of SCell index information.

(12E) mobilityControlInfoSCG is information required to change the secondary cell group, and may include an identifier assigned to the terminal apparatus 2 in the secondary cell group, information used to specify the individual random access parameters allocated to the terminal apparatus 2, and/or information about a ciphering algorithm.

Note that the above message is an example, and the RRC connection reconfiguration message may include information other than the above RRC connection reconfiguration message, or may not include some pieces of information on the RRC connection reconfiguration message. The RRC connection reconfiguration message may be different from the above RRC connection reconfiguration message in a structure, an information element name, or a parameter name.

Next, a description is given of an example of an operation of configuring the measurement configuration from the MN and the SN to the terminal apparatus 2.

First, an example of the measurement configuration in a case that the measurement objects of the MN and the SN are common will be described using FIG. 13 and FIG. 14.

Figure 13:
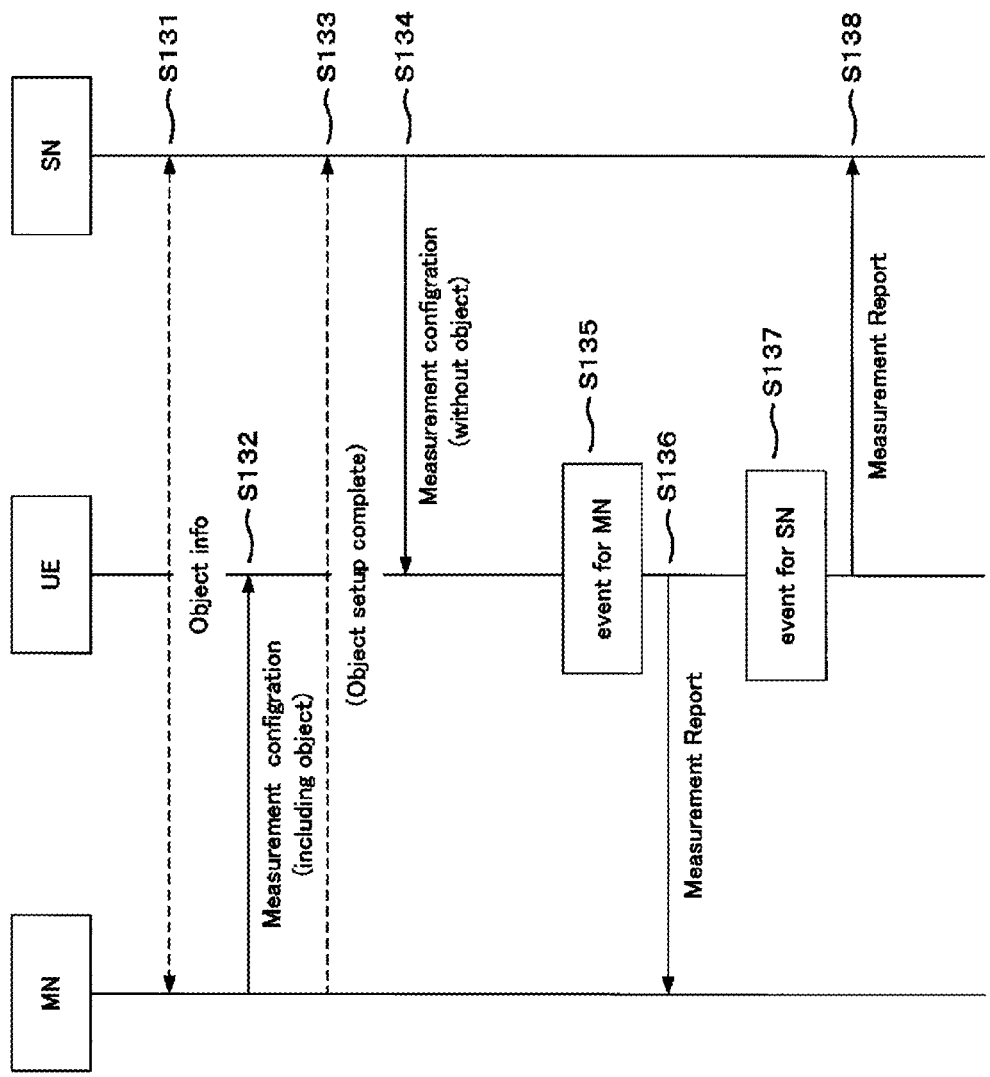
FIG. 13 is a diagram illustrating an example of a measurement configuration procedure according to the embodiment of the present invention.

In FIG. 13, the MN configures a measurement configuration including a measurement object available in common with the SN to the terminal apparatus 2 via an MCG SRB (step S132). Prior to this, information on the measurement object required by the SN may be notified to the MN (step S131). The information on the measurement object required by the SN may be notified through an SN Addition Request Acknowledge message or an SN Modification Request Acknowledge message or an SN Addition Required message or an SN Modification Required message or other RRC message.

With the MN being in the EUTRAN and the SN being in the NG-RAN, the MN may use a EUTRAN RRC message (also referred to as an LTE RRC message or a EUTRA RRC message) and the SN may use an NG-RAN RRC message (also referred to as an NR RRC message). NR is configured as the InterRAT configuration in the EUTRAN RRC message, while EUTRA is configured as the InterRAT configuration in the NG-RAN RRC message.

In a case that the measurement configuration is successful (for example, in a case of receiving the RRC connection reconfiguration complete message from the terminal apparatus 2), the MN may notify the SN of the information on the measurement object (step S133).

The SN configures a measurement configuration not including a measurement object to the terminal apparatus 2 via an SCG SRB (step S134).

Figure 14:
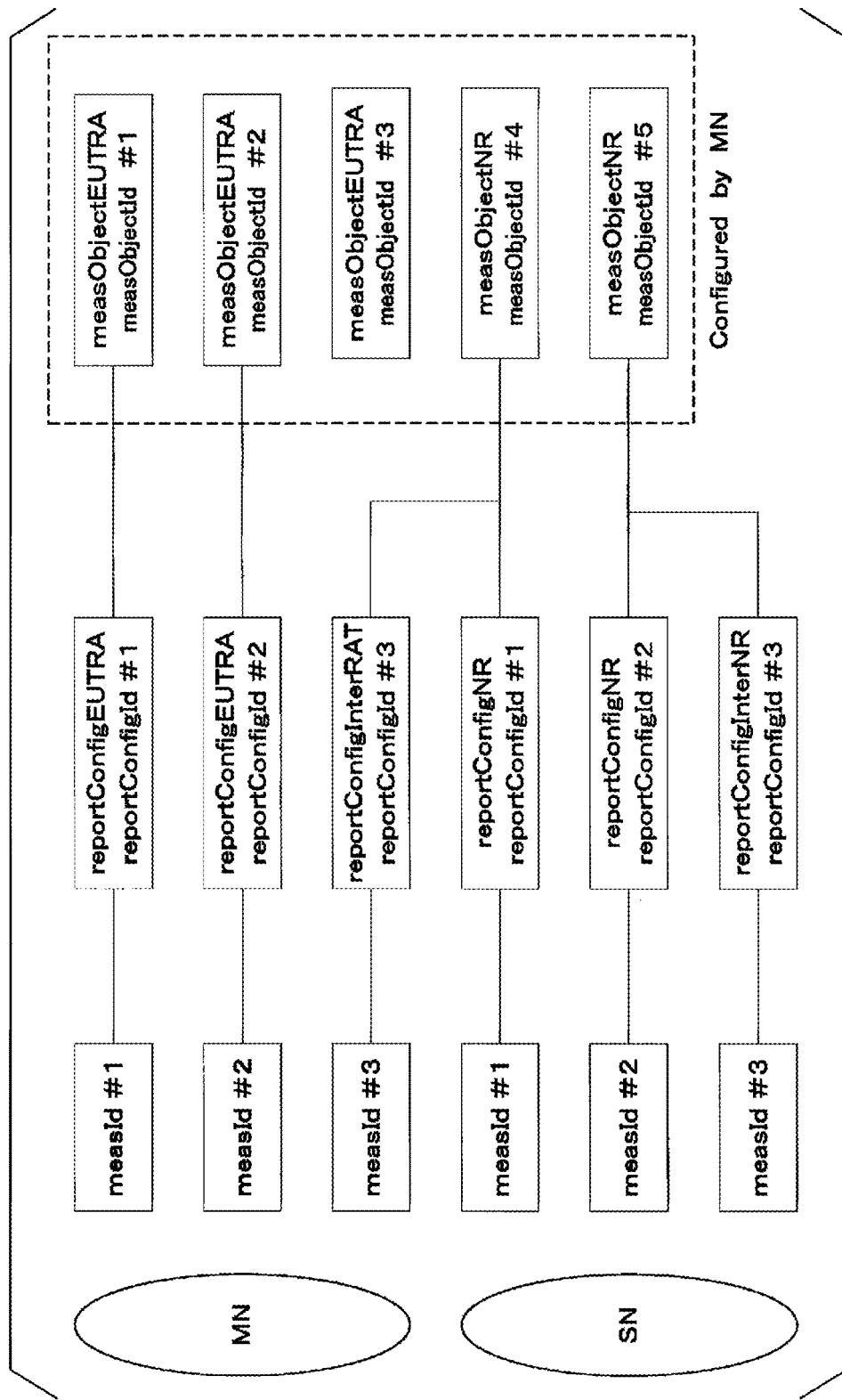
FIG. 14 is a diagram illustrating an example of a measurement configuration according to the embodiment of the present invention.

Here, an example of the measurement configuration configured in step S132 and step S134 is illustrated in FIG. 14.

In FIG. 14, on the MN side, five measurement objects are configured for the terminal apparatus 2, and two report configurations EUTRA (reportConfigEUTRAs) and one reportConfigInterRAT are configured. Combinations of these three reporting configurations and the measurement objects respectively associated are configured with the measurement identifiers. On the SN side, five measurement objects common to the MN are configured for the terminal apparatus 2, and three reportConfigNRs are configured. Combinations of these three reporting configurations and the measurement objects respectively associated are configured with the measurement identifiers.

At this time, as for the serving cell, the serving cell in the measurement on the MN side may be only the cell of the MN (MCG cell), or the cells of both the MN and the SN. For example, in a case that the serving cell in the measurement on the MN side is only the cell of the MN, EventA6 for the frequency of only the cell of the SN is not supported in the measurement on the MN side. In other words, in a case where EventA6 is associated with a measurement object at the frequency of only the cell of the SN, the terminal apparatus 2 does not consider this configuration to be valid. In a case that the serving cell in the measurement on the MN side is each of the cells of both the MN and the SN, EventA6 for the frequency of only the cell of the SN may be supported in the measurement on the MN side.

As for the serving cell, the serving cell in the measurement on the SN side may be only the cell of the SN (SCG cell), or the cells of both the MN and the SN. For example, in a case that the serving cell in the measurement on the SN side is only the cell of the SN, EventA6 for the frequency of only the cell of the MN is not supported in the measurement on the SN side. In other words, in a case where EventA6 is associated with a measurement object at the frequency of only the cell of the MN, the terminal apparatus 2 does not consider this configuration to be valid. In a case that the serving cell in the measurement on the SN side is each of the cells of both the MN and the SN, EventA6 for the frequency of only the cell of the MN may be supported in the measurement on the MN side.

The measurement objects may be all different in the frequency. Alternatively, the frequency may be the same within the measObjectEUTRA or within the measObjectNR, and the frequencies may be different between the measObjectEUTRA and the measObjectNR.

In a case that the terminal apparatus 2 configured with the above measurement configuration satisfies the condition of the reporting configuration configured by the MN (or, configured via the MCG SRB) (step S135), the terminal apparatus 2 notifies the MN of the measurement result (via the MCG SRB) (step S136), or in a case that the terminal apparatus 2 satisfies the condition of the reporting configuration configured by the SN (or, configured via the SCG SRB) (step S137), the terminal apparatus 2 notifies the SN of the measurement result (via the SCG SRB) (step S138).

This enables an efficient measurement without the frequencies of the measuring objects overlapping.

Note that in the process described above, the SN may configure a portion of the measuring object in step S134. In this case, the measurement object identifier may use the value reserved in advance for the SN. This can increase the flexibility of the measurement configuration by the SN.

Next, an example of the measurement configuration in a case that the measurement objects of the MN and the SN are independent from each other will be described using FIG. 15 and FIG. 16.

Figure 15:
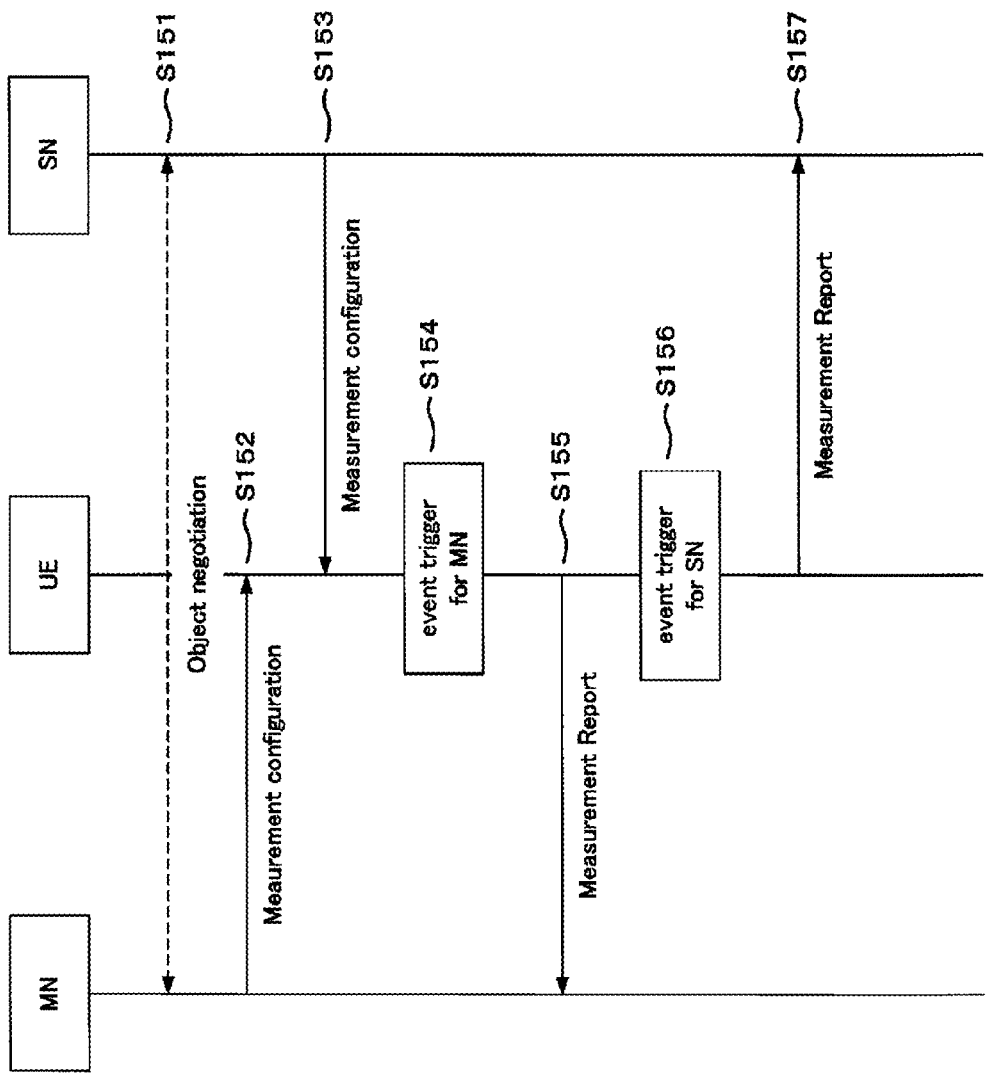
FIG. 15 is a diagram illustrating another example of a measurement configuration procedure according to the embodiment of the present invention.

In FIG. 15, the MN configures a measurement configuration including a measurement object independent from the SN to the terminal apparatus 2 via an MCG SRB (step S152). Prior to this, the MN and the SN may notify each other of information on the measurement objects configured (step S151).

The SN configures a measurement configuration including a measurement object independent from the MN to the terminal apparatus 2 via an SCG SRB (step S153).

Figure 16:
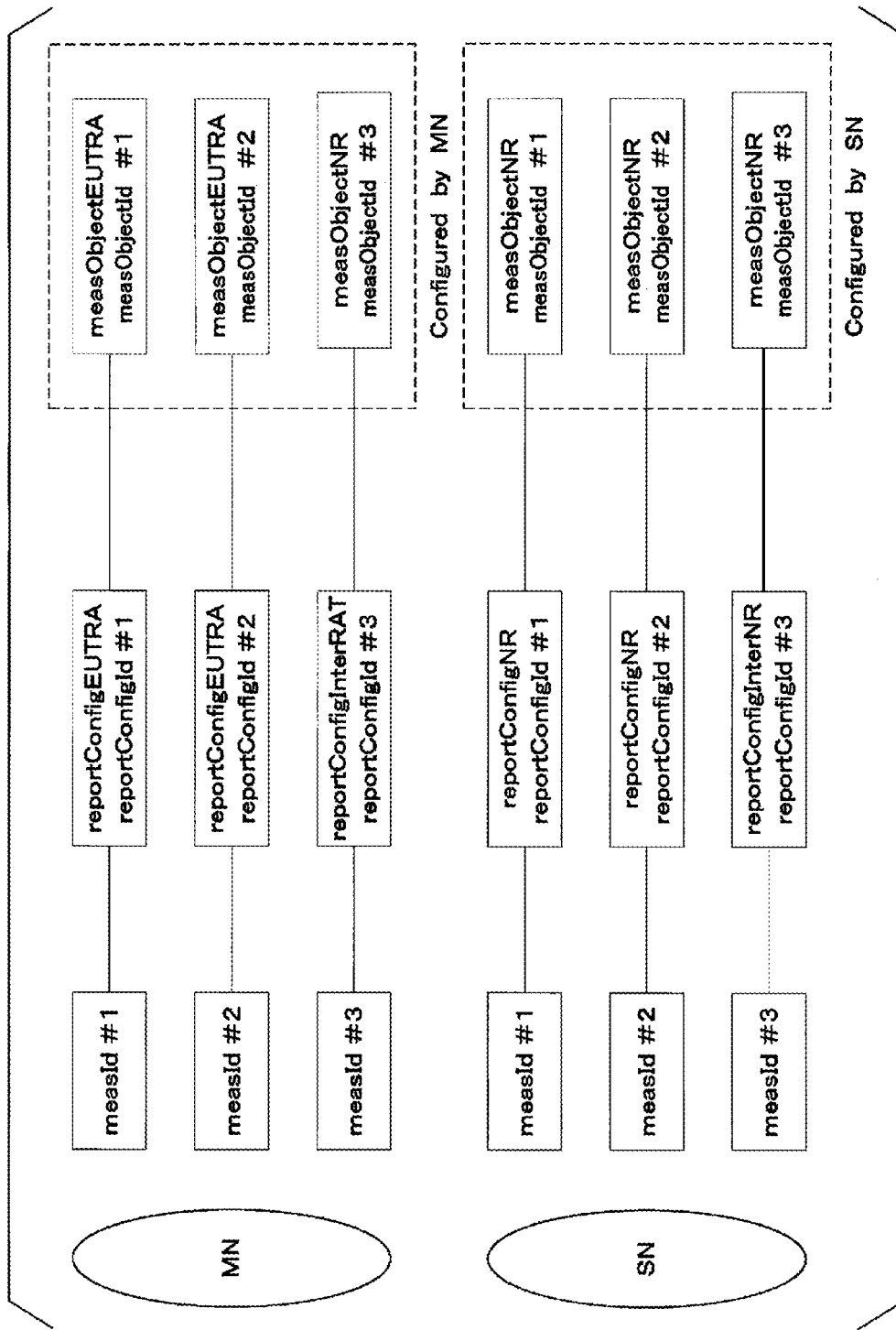
FIG. 16 is a diagram illustrating another example of a measurement configuration according to the embodiment of the present invention.

Here, an example of the measurement configuration configured in step S152 and step S153 is illustrated in FIG. 16.

In FIG. 16, on the MN side, three measurement objects are configured for the terminal apparatus 2, and two report configurations EUTRA (reportConfigEUTRAs) and one reportConfigInterRAT are configured. Combinations of these three reporting configurations and the measurement objects respectively associated are configured with the measurement identifiers. On the SN side, three measurement objects independent from the MN are configured for the terminal apparatus 2, and three reportConfigNRs are configured. Combinations of these three reporting configurations and the measurement objects respectively associated are configured with the measurement identifiers.

At this time, as for the serving cell, the serving cell in the measurement on the MN side may be only the cell of the MN (MCG cell), and the serving cell in the measurement on the SN side may be only the cell of the SN (SCG cell).

In a case that the terminal apparatus 2 configured with the above measurement configuration satisfies the condition of the reporting configuration configured by the MN (or, configured via the MCG SRB) (step S154), the terminal apparatus 2 notifies the MN of the measurement result (via the MCG SRB) (step S155), or in a case that the terminal apparatus 2 satisfies the condition of the reporting configuration configured by the SN (or, configured via the SCG SRB) (step S156), the terminal apparatus 2 notifies the SN of the measurement result (via the SCG SRB) (step S157).

This allows the MN and SN to perform efficient measurements without being affected by the configuration of each other.

In the description of FIG. 16, the frequency of the measurement object configured in the measurement on the SN side may be only the frequency of the SCG serving cell, and the other frequencies may be configured only in the measurement on the MN side. For example, the SN may notify the MN of information on the measurement object having the frequency which is other than the frequency of the SCG serving cell and is required to be measured (e.g., some or all of the information included in the measurement object NR), and the MN may configure the measurement object. By providing such constraints, it is possible to eliminate the possibility that a combination of frequencies for the measurements independently configured by the MN and the SN respectively cannot be accommodated in the radio configuration of the terminal apparatus 2.

Next, the measurement report will be described. FIG. 17 is a diagram illustrating an example of the measurement results (measResults) reported by the terminal apparatus 2 to the MN and/or the SN. The measurement results include some or all of a measurement identifier (measId) triggering the reporting, information (measResultPCell) including a received power (RSRP or SSRP) and/or reception quality (RSRQ or SSRQ) of the PCell, measurement results of the neighbor cells (measResultNeighCells) corresponding to the measurement identifier, and a list of serving frequency measurement results (measResultServFreqList). The measurement results of the neighbor cells may include one or more measurement results for each RAT (measResultListEUTRA, measResultListNR, MeasResultListNR, measResultListUTRA, measResultListGERAN, and measResultsCDMA2000).

An example of the list of the serving frequency measurement results (measResultServFreqList) is illustrated in FIG. 18. As illustrated in FIG. 18, the list of the serving frequency measurement results may include one or more serving frequency measurement results (MeasResultServFreq). The serving frequency measurement results may include ServCellIndex as an identifier of the serving frequency, information (measResultPCell) including a received power (RSRP or SSRP) and/or a reception quality (RSRQ or SSRQ) of the SCell at that frequency, and a cell identifier of a cell in the neighbor cells at that frequency having the best reception power (RSRP or SSRP) and/or reception quality (RSRQ or SSRQ) and the received power (RSRP or SSRP) and/or the reception quality (RSRQ or SSRQ).

An example of the list of the measurement results of the neighbor cells (measResultListEUTRA, measResultListNR) is illustrated in FIG. 19. As illustrated in FIG. 19, the list of the measurement results of the neighbor cells may include measurement results of one or more neighbor cells (measResultEUTRA, measResultNR). The measurement result of the neighbor cell may include some or all of an identifier of a neighbor cell (a physical cell identifier and a cell global identifier), and information (measResult) including a received power (RSRP or SSRP) and/or a reception quality (RSRQ or SSRQ) of the cell.

The list of the serving frequency measurement results (measResultServFreqList) of the above measurement results may be divided into the those of the cell of the MN and the cell of the SN (MCG and SCG). For example, the list of the serving frequency measurement results may be divided into a list of MN cell serving frequency measurement results (measResultServFreqListMCG) and a list of SN cell serving frequency measurement results (measResultServFreqListSCG). Additionally, the measResultServFreqListMCG and the measResultServFreqListSCG may be reported to the MN and only measResultServFreqListSCG may be notified to the SN.

In a case that a list of the measurement results for the neighbor cells of the above measurement results is generated, only any group of the MCG and the SCG may be considered as a serving cell, and the cells of the remaining group may be considered as the neighbor cells. For example, in a case that the MCG is constituted cells of EUTRA and the SCG is constituted cells of NR, the measurement report to the MN may be reported to the MN while considering only the MCG cells as the serving cells and the SCG cells as the neighbor cells and using measResultListNR if needed. The measurement report to the SN may be reported to the SN while considering only the SCG cells as the serving cells and the MCG cells as the neighbor cells and using measResultListEUTRA if needed.

In a case that the reporting described above is performed, the terminal apparatus 2 may determine, based on the information notified from the MN, the measurement results of any of the serving cells are included in the measurement report reported to the MN and/or the SN. For example, in a case that information limiting the reporting for the SN is notified by the MN, the terminal apparatus 2 may report the measurement results including those of the MCG cells and SCG cells as the measurement results of the serving cell to the MN, and report the measurement results including those of the SCG cells only as the measurement results of the serving cell to the SN. In a case that information limiting the overall reporting is notified by the MN, the terminal apparatus 2 may report the measurement results including those of the MCG cells only as the measurement results of the serving cell to the MN, and report the measurement results including those of the SCG cells only as the measurement results of the serving cell to the SN.

This allows the base station apparatus 3 to configure appropriate radio resources for the terminal apparatus 2.

A configuration of the apparatus in the embodiment of the present invention will be described.

FIG. 2 is a schematic block diagram illustrating a configuration of the terminal apparatus 2 according to the present embodiment. As illustrated in the drawing, the terminal apparatus 2 is configured to include a radio transmission and/or reception unit 20 and a higher layer processing unit 24. The radio transmission and/or reception unit 20 is configured to include an antenna unit 21, a Radio Frequency (RF) unit 22, and a baseband unit 23. The higher layer processing unit 24 is configured to include a medium access control layer processing unit 25 and a radio resource control layer processing unit 26. The radio transmission and/or reception unit 20 is also referred to as a transmitter, a receiver or a physical layer processing unit. A controller controlling operations of the units, based on various conditions may be separately provided.

The higher layer processing unit 24 outputs uplink data (transport block) generated by a user operation or the like, to the radio transmission and/or reception unit 20. The higher layer processing unit 24 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 25 included in the higher layer processing unit 24 performs processing of the Medium Access Control layer. The medium access control layer processing unit 25 controls transmission of a scheduling request, based on various types of configuration information/parameters managed by the radio resource control layer processing unit 26.

The radio resource control layer processing unit 26 included in the higher layer processing unit 24 performs processing of the Radio Resource Control layer. The radio resource control layer processing unit 26 manages various types of configuration information/parameters of its own apparatus. The radio resource control layer processing unit 26 sets various types of configuration information/parameters, based on higher layer signaling received from the base station apparatus 3. Namely, the radio resource control layer processing unit 26 sets the various configuration information/parameters in accordance with the information indicating the various configuration information/parameters received from the base station apparatus 3.

The radio transmission and/or reception unit 20 performs processing of the physical layer, such as modulation, demodulation, coding, decoding, and the like. The radio transmission and/or reception unit 20 demultiplexes, demodulates, and decodes a signal received from the base station apparatus 3, and outputs the information resulting from the decoding to the higher layer processing unit 24. The radio transmission and/or reception unit 20 generates a transmit signal by modulating and coding data, and transmits the generated signal to the base station apparatus 3.

The RF unit 22 converts (down converts) a signal received via the antenna unit 21 into a baseband signal by orthogonal demodulation, and removes unnecessary frequency components. The RF unit 22 outputs the processed analog signal to the baseband unit.

The baseband unit 23 converts the analog signal input from the RF unit 22 into a digital signal. The baseband unit 23 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 23 generates an SC-FDMA symbol by performing Inverse Fast Fourier Transform (IFFT) of the data, adds the CP to the generated SC-FDMA symbol, generates a baseband digital signal, and converts the baseband digital signal into an analog signal. The baseband unit 23 outputs the analog signal resulting from the conversion, to the RF unit 22.

The RF unit 22 removes unnecessary frequency components from the analog signal input from the baseband unit 23 using a low-pass filter, up-converts the analog signal into a signal of a carrier frequency, and transmits the up-converted signal via the antenna unit 21. Furthermore, the RF unit 22 amplifies power. The RF unit 22 may have a function to control transmit power. The RF unit 22 is also referred to as a transmit power controller.

Note that the terminal apparatus 2 may include pluralities of some units or pluralities of all the units in order to support transmission and/or reception processing in the same subframe of multiple frequencies (frequency bands or frequency band widths) or multiple cells.

Figure 3:
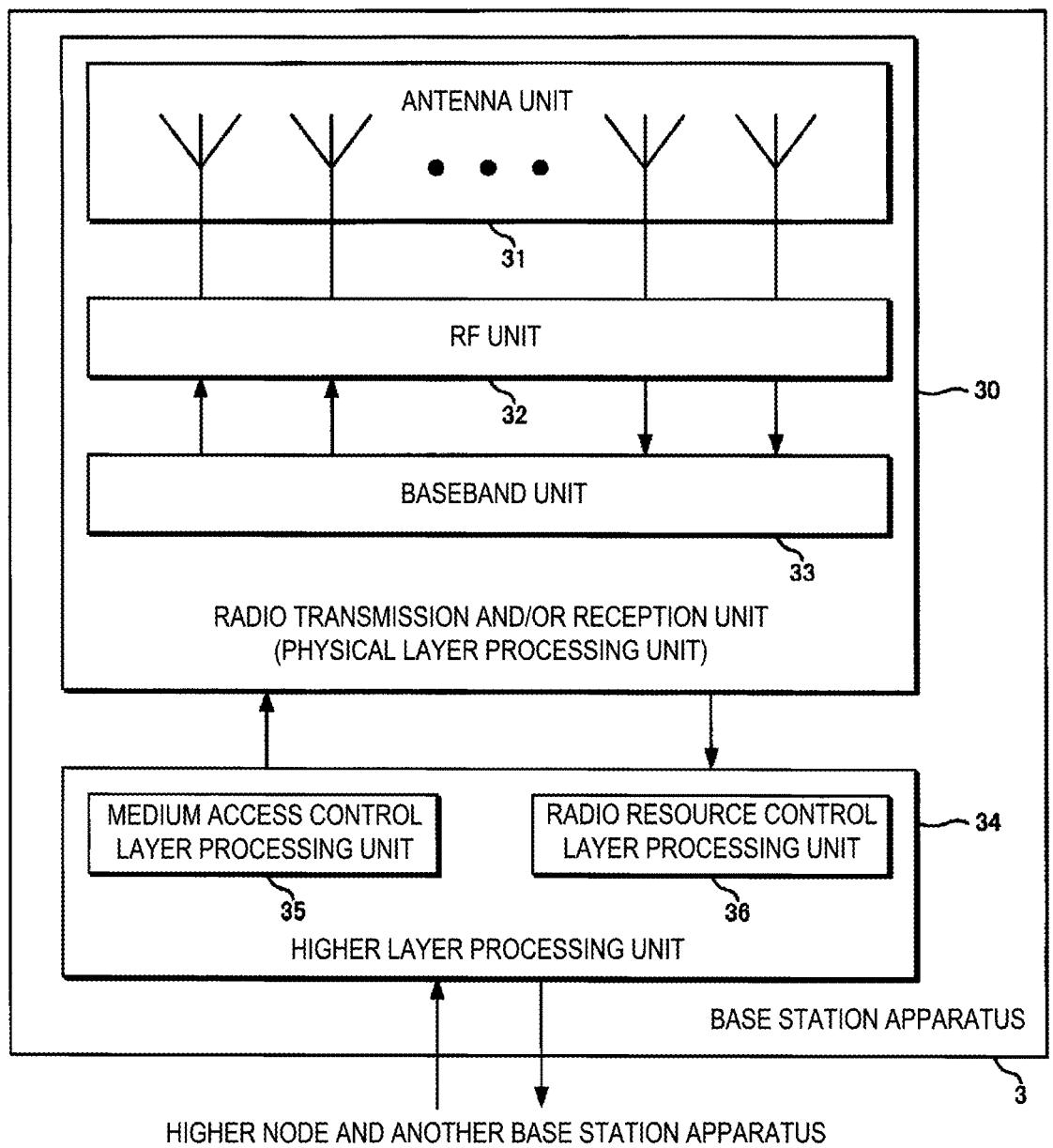
FIG. 3 is a block diagram illustrating an example of a schematic configuration of a base station apparatus according to the embodiment of the present invention.

FIG. 3 is a schematic block diagram illustrating a configuration of the base station apparatus 3 according to the present embodiment. As illustrated in the drawing, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit. A controller controlling operations of the units, based on various conditions may be separately provided.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and outputs the generated or acquired data to the radio transmission and/or reception unit 30. The radio resource control layer processing unit 36 manages various types of configuration information/parameters for each of the terminal apparatuses 2. The radio resource control layer processing unit 36 may set various types of configuration information/parameters for each of the terminal apparatuses 2 via the higher layer signal. Namely, the radio resource control layer processing unit 36 transmits/broadcasts information indicating various types of configuration information/parameters.

The functions of the radio transmission and/or reception unit 30 is similar to the functionality of the radio transmission and/or reception unit 20, and hence description thereof is omitted. Note that in a case that the base station apparatus 3 is connected to one or more transmission reception points 4, some or all of the functions of the radio transmission and/or reception unit 30 may be included in each of the transmission reception points 4.

The higher layer processing unit 34 transmits (transfers) or receives control messages or user data between the base station apparatuses 3, or between a higher network apparatus (MME or Serving-GW (S-GW)) and the base station apparatus 3. Although, in FIG. 3, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a Radio Resource Management layer processing unit or an application layer processing unit exists in the higher level than the radio resource control layer processing unit 36.

Note that "units" in the drawing refer to constituent elements to realize the functions and the procedures of the terminal apparatus 2 and the base station apparatus 3, which are also represented by the terms such as a section, a circuit, a constituting apparatus, a device, a unit, and the like.

Each of the units designated by the reference signs 20 to 26 included in the terminal apparatus 2 may be configured as a circuit. Each of the units designated by the reference signs 30 to 36 included in the base station apparatus 3 may be configured as a circuit.

Various aspects of the terminal apparatus 2 and the base station apparatus 3 according to the embodiment of the present invention will be described.

(1) A first aspect of the present invention is a terminal apparatus for receiving a measurement configuration from one or more base station apparatuses, the measurement configuration including a measurement object, a reporting configuration, and a measurement identifier, the measurement object including at least an identifier for individually identifying the measurement object (measurement object identifier) and information of a frequency to be measured, the reporting configuration including at least an identifier for individually identifying the reporting configuration (reporting configuration identifier) and information of a condition to be reported, and the measurement identifier being an identifier for individually identifying information for indicating a combination of the measurement object identifier and the reporting configuration identifier, the terminal apparatus including a receiver configured to individually receive the reporting configuration via a first signaling radio bearer (first SRB) and a second signaling radio bearer (second SRB), and a transmitter configured to transmit via the first SRB a first measurement result corresponding to the measurement identifier received via the first SRB, and transmit via the second SRB a second measurement result corresponding to the measurement identifier received via the second SRB, wherein the first measurement result includes, as measurement results of a serving cell, the measurement results of the serving cell of a first cell group and the serving cell of a second cell group, and the second measurement result includes, as a measurement result of a serving cell, the measurement result of the serving cell of the second cell group.

(2) In the first of the present invention, a determination is made, based on a signal notified by the first SRB, on whether to include, as the measurement result of the serving cell, the measurement result of the serving cell of the first cell group in the second measurement result.

(3) A second aspect of the present invention is a base station apparatus for transmitting a measurement configuration to a terminal apparatus (first base station apparatus), the measurement configuration including a measurement object, a reporting configuration, and a measurement identifier, the measurement object including at least an identifier for individually identifying the measurement object (measurement object identifier) and information of a frequency to be measured, the reporting configuration including at least an identifier for individually identifying the reporting configuration (reporting configuration identifier) and information of a condition to be reported, and the measurement identifier being an identifier for individually identifying information for indicating a combination of the measurement object identifier and the reporting configuration identifier, the base station apparatus including a control unit configured to determine whether to include a measurement result of a serving cell of a cell group for the first base station apparatus in the measurement result of the serving cell included in the measurement result notified from the terminal apparatus to another base station apparatus (second base station apparatus), and a transmitter configured to transmit information for indicating whether to include the measurement result of the serving cell of the cell group for the first base station apparatus.

(4) A third aspect of the present invention is a communication method applied to a terminal apparatus for receiving a measurement configuration from one or more base station apparatuses, the measurement configuration including a measurement object, a reporting configuration, and a measurement identifier, the measurement object including at least an identifier for individually identifying the measurement object (measurement object identifier) and information of a frequency to be measured, the reporting configuration including at least an identifier for identifying the reporting configuration (reporting configuration identifier) and information of a condition to be reported, and the measurement identifier being an identifier for individually identifying information for indicating a combination of the measurement object identifier and the reporting configuration identifier, the method including the steps of individually receiving the reporting configuration via a first signaling radio bearer (first SRB) and a second signaling radio bearer (second SRB), and transmitting via the first SRB a first measurement result corresponding to the measurement identifier received via the first SRB, and transmitting via the second SRB a second measurement result corresponding to the measurement identifier received via the second SRB, wherein a the first measurement result includes, as measurement results of a serving cell, the measurement results of the serving cell of a first cell group and the serving cell of a second cell group, and the second measurement result includes, as a measurement result of a serving cell, the measurement result of the serving cell of the second cell group.

(5) A fourth aspect of the present invention is a communication method applied to a base station apparatus for transmitting a measurement configuration to a terminal apparatus (first base station apparatus), the measurement configuration including a measurement object, a reporting configuration, and a measurement identifier, the measurement object including at least an identifier for individually identifying the measurement object (measurement object identifier) and information of a frequency to be measured, the reporting configuration including at least an identifier for individually identifying the reporting configuration (reporting configuration identifier) and information of a condition to be reported, and the measurement identifier being an identifier for individually identifying information for indicating a combination of the measurement object identifier and the reporting configuration identifier, the communication method including the steps of determining whether to include a measurement result of a serving cell of a cell group for the first base station apparatus in the measurement result of the serving cell included in the measurement result notified from the terminal apparatus to another base station apparatus (second base station apparatus), and transmitting information for indicating whether to include the measurement result of the serving cell of the cell group for the first base station apparatus.

(6) A fifth aspect of the present invention is an integrated circuit mounted on a terminal apparatus for receiving a measurement configuration from one or more base station apparatuses, the measurement configuration including a measurement object, a reporting configuration, and a measurement identifier, the measurement object including at least an identifier for individually identifying the measurement object (measurement object identifier) and information of a frequency to be measured, the reporting configuration including at least an identifier for individually identifying the reporting configuration (reporting configuration identifier) and information of a condition to be reported, and the measurement identifier being an identifier for individually identifying information for indicating a combination of the measurement object identifier and the reporting configuration identifier, the integrated circuit causing the terminal apparatus to exert individually receiving the reporting configuration via a first signaling radio bearer (first SRB) and a second signaling radio bearer (second SRB), and transmitting via the first SRB a first measurement result corresponding to the measurement identifier received via the first SRB, and transmitting via the second SRB a second measurement result corresponding to the measurement identifier received via the second SRB, wherein the first measurement result includes, as measurement results of a serving cell, the measurement results of the serving cell of a first cell group and the serving cell of a second cell group, and the second measurement result includes, as a measurement result of a serving cell, the measurement result of the serving cell of the second cell group.

(7) A sixth aspect of the present invention is an integrated circuit mounted on a base station apparatus for transmitting a measurement configuration to a terminal apparatus (first base station apparatus), the measurement configuration including a measurement object, a reporting configuration, and a measurement identifier, the measurement object including at least an identifier for individually identifying the measurement object (measurement object identifier) and information of a frequency to be measured, the reporting configuration including at least an identifier for individually identifying the reporting configuration (reporting configuration identifier) and information of a condition to be reported, and the measurement identifier being an identifier for individually identifying information for indicating a combination of the measurement object identifier and the reporting configuration identifier, the integrated circuit causing the base station apparatus to exert determining whether to include a measurement result of a serving cell of a cell group for the first base station apparatus in the measurement result of the serving cell included in the measurement result notified from the terminal apparatus to another base station apparatus (second base station apparatus), and transmitting information for indicating whether to include the measurement result of the serving cell of the cell group for the first base station apparatus.

Consequently, the terminal apparatus 2 and the base station apparatus 3 can communicate efficiently.

Note that the embodiments discussed thus far are merely examples, and the embodiments can be implemented using various kinds of modifications, replacement, or the like. For example, an uplink transmission scheme can be applied to both communication systems of a Frequency Division Duplex (FDD) scheme and a Time Division Duplex (TDD) scheme. The names of the parameters, events, and the like indicated in the embodiments are given for the sake of convenience of description; therefore, even in a case that the actual applied names differ from the names in the embodiments of the present invention, the spirit of the invention claimed in the embodiments of the present invention is not affected in any way.

The term "connection" used in the respective embodiments is not limited to the configuration in which a certain apparatus and another apparatus are directly connected using a physical line, and includes a configuration in which the devices are logically connected, a configuration in which the devices are radio-connected using the radio technology, and the like.

The terminal apparatus 2 is also called a user terminal, a mobile station apparatus, a communication terminal, a mobile apparatus, a terminal, User Equipment (UE), and a Mobile Station (MS). The base station apparatus 3 is also called a radio base station apparatus, a base station, a radio base station, a fixed station, a NodeB (NB), an evolved NodeB (eNB), a Base Transceiver Station (BTS), a Base Station (BS), an NR NodeB (NR NB), an NNB, a Transmission and Reception Point (TRP), and a next generation Node B (gNB).

The base station apparatus 3 according to one aspect of the present invention can also be realized as an aggregation (an apparatus group) including multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 2 according to the above-described embodiment can also communicate with the base station apparatus 3 as the aggregation.

Furthermore, the base station apparatus 3 according to the above-described embodiment may serve as an Evolved Universal Terrestrial Radio Access Network (EUTRAN) or a Next Generation Core network (NextGen Core). The base station apparatus 3 according to the above-described embodiment may have some or all of the functions of a node higher than an eNodeB.

A program running on an apparatus according to an aspect of the present invention may serve as a program that controls a Central Processing Unit (CPU) and the like to cause a computer to operate in such a manner as to realize the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiment may be partially enabled by a computer. In that case, this configuration may be realized by recording a program for realizing such control functions on a computer-readable recording medium and causing a computer system to read the program recorded on the recording medium for execution. Note that the "computer system" herein refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or instead, a known type of a processor, a controller, a micro-controller, or a state machine. The general-purpose processor or the above-mentioned circuits may be configured of a digital circuit, or may be configured of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical measures disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST

2 Terminal apparatus
3 Base station apparatus
20, 30 Radio transmission and/or reception unit
21, 31 Antenna unit
22, 32 RF unit
23, 33 Baseband unit
24, 34 Higher layer processing unit
25, 35 Medium access control layer processing unit
26, 36 Radio resource control layer processing unit
4 Transmission reception point

The invention claimed is:

1. A terminal apparatus comprising:
communication circuitry configured to communicate with a first base station apparatus via a master cell group in a first Radio Access Technology (RAT) and to communicate with a second base station apparatus via a secondary cell group in a second RAT using a dual connectivity;
reception circuitry configured to receive a first measurement configuration from the first base station apparatus and a second measurement configuration from the second base station apparatus; and
transmission circuitry configured to transmit a first measurement result to the first base station apparatus based on the first measurement configuration and a second measurement result to the second base station apparatus based on the second measurement configuration, wherein
the first measurement result includes measurement results of both of a serving cell of the master cell group and a serving cell of the secondary cell group as the measurement results of the serving cells,
the second measurement result includes a measurement result of the serving cell of the secondary cell group as the measurement result of the serving cell,
the second measurement result does not include a measurement result of the serving cell of the master cell group as the measurement result of the serving cell,
the first measurement configuration includes a first measurement object and a first measurement report configuration and a first measurement identity,
the first measurement object includes a first measurement object identity to identify each of measurement objects and information related to a first frequency to measure,
the first measurement report configuration includes a first measurement report configuration identity to identify each of measurement report configurations and information related to a condition to report the first measurement result,
the first measurement identity identifies an association of the first measurement object identity and the first measurement report configuration identity,
the second measurement configuration includes a second measurement object and a second measurement report configuration and a second measurement identity,
the second measurement object includes a second measurement object identity to identify each of measurement objects and information related to a second frequency to measure,
the second measurement report configuration includes a second measurement report configuration identity to identify each of measurement report configurations and information related to a condition to report the second measurement result, and
the second measurement identity identifies an association of the second measurement object identity and the second measurement report configuration identity.

2. A communication method for a terminal apparatus, the communication method comprising:
communicating, by communication circuitry, with a first base station apparatus via a master cell group in a first Radio Access Technology (RAT);
communicating, by the communication circuitry, with a second base station apparatus via a secondary cell group in a second RAT using a dual connectivity;
receiving a first measurement configuration from the first base station apparatus and a second measurement configuration from the second base station apparatus; and
transmitting a first measurement result to the first base station apparatus based on the first measurement configuration and a second measurement result to the second base station apparatus based on the second measurement configuration, wherein
the first measurement result includes measurement results of both of a serving cell of the master cell group and a serving cell of the secondary cell group as the measurement results of the serving cells,
the second measurement result includes a measurement result of the serving cell of the secondary cell group as the measurement result of the serving cell,
the second measurement result does not include a measurement result of the serving cell of the master cell group as the measurement result of the serving cell,
the first measurement configuration includes a first measurement object and a first measurement report configuration and a first measurement identity,
the first measurement object includes a first measurement object identity to identify each of measurement objects and information related to a first frequency to measure,
the first measurement report configuration includes a first measurement report configuration identity to identify each of measurement report configurations and information related to a condition to report the first measurement result,
the first measurement identity identifies an association of the first measurement object identity and the first measurement report configuration identity,
the second measurement configuration includes a second measurement object and a second measurement report configuration and a second measurement identity,
the second measurement object includes a second measurement object identity to identify each of measurement objects and information related to a second frequency to measure,
the second measurement report configuration includes a second measurement report configuration identity to identify each of measurement report configurations and information related to a condition to report the second measurement result, and
the second measurement identity identifies an association of the second measurement object identity and the second measurement report configuration identity.

* * * * *